US008668571B2

(12) United States Patent
Hedrick et al.

(10) Patent No.: US 8,668,571 B2
(45) Date of Patent: Mar. 11, 2014

(54) STEPPER REEL AND VARIABLE COVER DISPLAY FOR BINGO GAME

(75) Inventors: Joseph R. Hedrick, Reno, NV (US); Anthony J. Baerlocher, Reno, NV (US); Joseph E. Kaminkow, Reno, NV (US)

(73) Assignee: IGT, Las Vegas, NV (US)

( * ) Notice: Subject to any disclaimer, the term of this patent is extended or adjusted under 35 U.S.C. 154(b) by 2211 days.

(21) Appl. No.: 11/020,480

(22) Filed: Dec. 22, 2004

(65) Prior Publication Data

US 2006/0135245 A1 Jun. 22, 2006

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC ........................................ 463/20; 273/143 R

(58) Field of Classification Search
USPC ........................................ 273/143 R; 463/20
See application file for complete search history.

(56) References Cited

U.S. PATENT DOCUMENTS 2,077,124 A 4/1937 Miller et al.
3,420,525 A 1/1969 Waders
3,642,287 A 2/1972 Lally et al.
3,735,987 A 5/1973 Ohki
4,006,300 A 2/1977 Boldt et al.
4,063,289 A 12/1977 Veenendaal
4,326,351 A 4/1982 Heywood et al.
4,346,900 A 8/1982 Lamlee
4,448,419 A 5/1984 Telnaes
4,492,378 A 1/1985 Williams
4,648,600 A 3/1987 Olliges
4,695,053 A 9/1987 Vazquez, Jr. et al.
4,813,675 A 3/1989 Greenwood
4,826,169 A 5/1989 Bessho et al.
4,898,555 A 2/1990 Sampson
4,991,848 A 2/1991 Greenwood et al.
5,152,529 A * 10/1992 Okada ............................ 463/20

(Continued)

FOREIGN PATENT DOCUMENTS

GB 2137392 A 10/1984
GB 2201821 9/1988

(Continued)

OTHER PUBLICATIONS

Elvis, Brochure, IGT, copyright 1999. (2 pages).

(Continued)

*Primary Examiner* — Milap Shah
*Assistant Examiner* — Jason Pinheiro
(74) *Attorney, Agent, or Firm* — Neal, Gerber & Eisenberg LLP

(57) ABSTRACT

The invention is directed to methods and gaming apparatus for allowing a player to participate in a multi-player wagering game. The outcome of the multi-player wagering game may be displayed to the player, along with an alternate outcome display at an alternate outcome display device. The alternate outcome display device may include a rotatable reel and a cover variably disposed in front of the rotatable reel. The gaming apparatus controller may receive a display request where the alternate outcome display device disposes a cover to visibly obscure the reel if the request is to obscure the reel, and disposes the cover to visibly display the reel if the request is to observe the reel.

29 Claims, 19 Drawing Sheets

(56) References Cited

U.S. PATENT DOCUMENTS

| | | | | | |
|---|---|---|---|---|---|
| 5,184,821 | A | | 2/1993 | Korenek | |
| 5,188,363 | A | | 2/1993 | Marnell, II et al. | |
| 5,259,616 | A | | 11/1993 | Bergmann | |
| 5,264,765 | A | * | 11/1993 | Pecorino et al. | 318/265 |
| 5,292,127 | A | | 3/1994 | Kelly et al. | |
| 5,364,100 | A | * | 11/1994 | Ludlow et al. | 273/143 R |
| 5,395,111 | A | | 3/1995 | Inoue | |
| 5,553,851 | A | | 9/1996 | Malavazos et al. | |
| 5,580,309 | A | | 12/1996 | Piechowiak et al. | |
| 5,584,763 | A | | 12/1996 | Kelly et al. | |
| 5,639,089 | A | | 6/1997 | Matsumoto et al. | |
| 5,647,798 | A | | 7/1997 | Falciglia | |
| D392,340 | S | | 3/1998 | DeSimone | |
| 5,752,881 | A | | 5/1998 | Inoue | |
| 5,755,619 | A | | 5/1998 | Matsumoto et al. | |
| 5,766,074 | A | * | 6/1998 | Cannon et al. | 463/16 |
| 5,788,573 | A | | 8/1998 | Baerlocher et al. | |
| 5,823,874 | A | | 10/1998 | Adams | |
| 5,848,932 | A | | 12/1998 | Adams | |
| D404,436 | S | | 1/1999 | McGahn et al. | |
| 5,879,235 | A | | 3/1999 | Kaneko et al. | |
| 5,911,418 | A | | 6/1999 | Adams | |
| 5,947,820 | A | | 9/1999 | Morro et al. | |
| D416,054 | S | | 11/1999 | McGahn et al. | |
| 5,984,782 | A | | 11/1999 | Inoue | |
| 6,004,207 | A | | 12/1999 | Wilson, Jr. et al. | |
| 6,012,982 | A | | 1/2000 | Piechowiak et al. | |
| D421,277 | S | | 2/2000 | McGahn et al. | |
| 6,033,307 | A | | 3/2000 | Vancura | |
| 6,039,649 | A | | 3/2000 | Schulze | |
| 6,059,658 | A | | 5/2000 | Mangano et al. | |
| 6,082,734 | A | | 7/2000 | Uehara et al. | |
| 6,089,978 | A | | 7/2000 | Adams | |
| 6,095,921 | A | * | 8/2000 | Walker et al. | 463/20 |
| 6,102,798 | A | | 8/2000 | Bennett | |
| 6,105,962 | A | | 8/2000 | Malavazos et al. | |
| 6,113,098 | A | | 9/2000 | Adams | |
| 6,142,873 | A | | 11/2000 | Weiss et al. | |
| 6,149,156 | A | | 11/2000 | Faela | |
| 6,159,095 | A | | 12/2000 | Frohm et al. | |
| 6,162,121 | A | | 12/2000 | Morro et al. | |
| 6,168,520 | B1 | | 1/2001 | Baerlocher et al. | |
| 6,174,235 | B1 | | 1/2001 | Walker et al. | |
| 6,179,711 | B1 | | 1/2001 | Yoseloff | |
| 6,210,275 | B1 | | 4/2001 | Olsen | |
| 6,217,022 | B1 | | 4/2001 | Astaneha | |
| 6,224,483 | B1 | | 5/2001 | Mayeroff | |
| 6,254,481 | B1 | | 7/2001 | Jaffe | |
| 6,261,177 | B1 | | 7/2001 | Bennett | |
| 6,302,790 | B1 | | 10/2001 | Brossard | |
| 6,309,299 | B1 | | 10/2001 | Weiss | |
| 6,312,334 | B1 | | 11/2001 | Yoseloff | |
| 6,319,124 | B1 | | 11/2001 | Baerlocher et al. | |
| 6,334,814 | B1 | | 1/2002 | Adams | |
| 6,336,863 | B1 | | 1/2002 | Baerlocher et al. | |
| 6,364,767 | B1 | | 4/2002 | Brossard et al. | |
| 6,398,220 | B1 | | 6/2002 | Inoue | |
| 6,439,995 | B1 | | 8/2002 | Hughs-Baird | |
| 6,454,651 | B1 | | 9/2002 | Yoseloff | |
| 6,464,582 | B1 | | 10/2002 | Baerlocher et al. | |
| 6,471,208 | B2 | | 10/2002 | Yoseloff et al. | |
| 6,506,118 | B1 | | 1/2003 | Baerlocher et al. | |
| D473,270 | S | | 4/2003 | Seelig et al. | |
| 6,569,015 | B1 | | 5/2003 | Baerlocher et al. | |
| 6,572,473 | B1 | | 6/2003 | Baerlocher | |
| 6,575,541 | B1 | | 6/2003 | Hedrick et al. | |
| 6,582,306 | B1 | | 6/2003 | Kaminkow | |
| 6,659,864 | B2 | | 12/2003 | McGahn et al. | |
| 6,669,559 | B1 | | 12/2003 | Baerlocher et al. | |
| 6,676,512 | B2 | | 1/2004 | Fong et al. | |
| 6,692,355 | B2 | | 2/2004 | Baerlocher et al. | |
| 6,702,409 | B2 | | 3/2004 | Hedrick et al. | |
| 6,726,204 | B2 | | 4/2004 | Inoue | |
| 6,726,565 | B2 | | 4/2004 | Hugh-Baird | |
| 7,029,395 | B1 | | 4/2006 | Baerlocher | |
| 7,070,505 | B2 | | 7/2006 | Vancura et al. | |
| 7,217,189 | B2 | | 5/2007 | Kaminkow | |
| 7,250,001 | B2 | | 7/2007 | Baerlocher et al. | |
| 7,306,518 | B2 | | 12/2007 | Hugh-Baird et al. | |
| 7,326,115 | B2 | | 2/2008 | Baerlocher | |
| 2002/0072402 | A1 | | 6/2002 | Baerlocher | |
| 2002/0142822 | A1 | | 10/2002 | Baerlocher et al. | |
| 2002/0183109 | A1 | | 12/2002 | McGahn et al. | |
| 2003/0040360 | A1 | | 2/2003 | Kaminkow | |
| 2003/0078093 | A1 | | 4/2003 | Simms | |
| 2003/0078096 | A1 | | 4/2003 | Kaminkow | |
| 2003/0119583 | A1 | | 6/2003 | Kaminkow et al. | |
| 2003/0162578 | A1 | | 8/2003 | Baerlocher et al. | |
| 2003/0162584 | A1 | | 8/2003 | Hugh-Baird | |
| 2003/0195027 | A1 | | 10/2003 | Baerlocher | |
| 2004/0012145 | A1 | | 1/2004 | Inoue | |
| 2004/0014516 | A1 | | 1/2004 | Inoue | |
| 2004/0014517 | A1 | | 1/2004 | Inoue | |
| 2004/0018866 | A1 | | 1/2004 | Inoue | |
| 2004/0026854 | A1 | | 2/2004 | Inoue | |
| 2004/0036218 | A1 | | 2/2004 | Inoue | |
| 2004/0038726 | A1 | | 2/2004 | Inoue | |

FOREIGN PATENT DOCUMENTS

| | | | |
|---|---|---|---|
| GB | 2226436 | A | 6/1990 |
| GB | 2242300 | A | 9/1991 |
| GB | 2322217 | | 12/1997 |

OTHER PUBLICATIONS

Let's Make a Deal Game Brochure, Bally Gaming Systems, copyright 1999. (2 pages).

Let's Make a Deal, fortunecity.com (http://meltingpot.fortunecity.com/andorra/57/lmad.html), printed on Mar. 21, 2001. (4 pages).

Let's Make a Deal, geocities.com (www.geocities.com/Hollywood/Bungalow/2827/lmad.html), printed on Mar. 21, 2001. (10 pages).

Let's Make a Deal, geocities.com (www.geocities.com/TelevisionCity/Set/7880/RULES/LMaD.html), printed on Mar. 16, 2001. (2 pages).

Let's Make a Deal, Illinoislottery.com (www.illinoislottery.com/lmad.htm), printed on Mar. 21, 2001. (1 page).

The Official Let's Make a Deal Website, Debut of the Let's Make a Deal Slot Machine, Bally Gaming System Website (www.letsmakeadeal.com/pr01.htm), printed on Mar. 16, 2001. (2 pages).

Wheel of Fortune, Brochure, IGT, copyright 1998. (2 pages).

Wheel of Fortune Video, Brochure, IGT, copyright 1999. ( 2 pages).

* cited by examiner

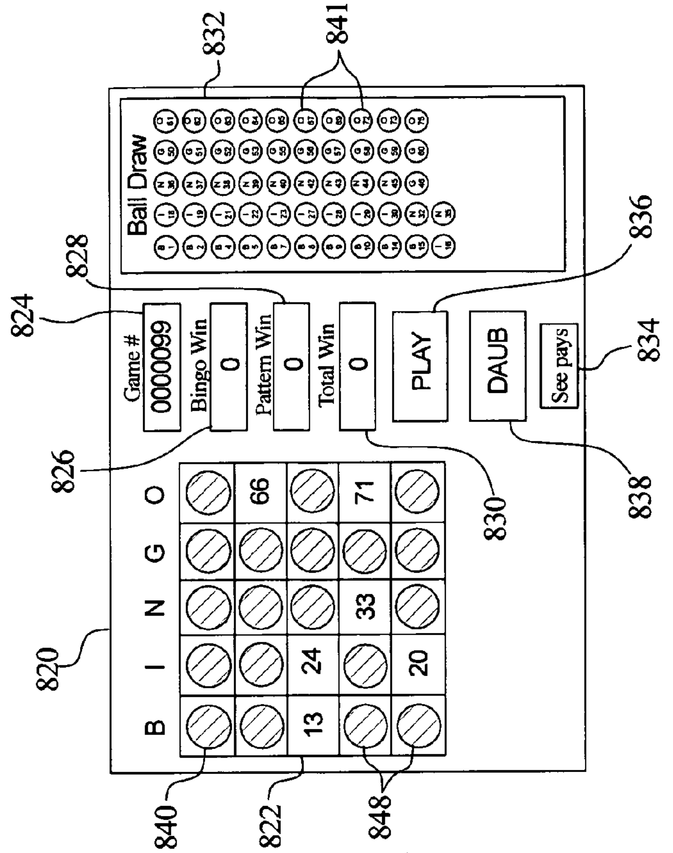
FIG. 10
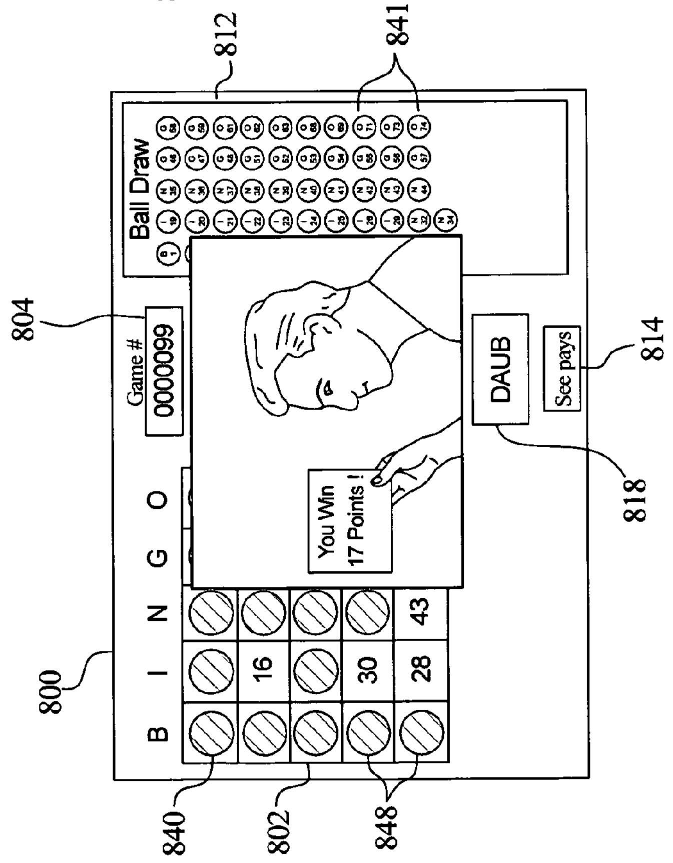

STEPPER REEL AND VARIABLE COVER DISPLAY FOR BINGO GAME

BACKGROUND

The present disclosure relates to gaming networks and, more particularly, to a gaming network providing a multi-player Bingo game wherein the gaming units include an alternate outcome display for displaying the outcome of the multi-player Bingo game and a cover that may be variably disposed in front of the alternate outcome display.

Indian gaming in the United States is divided into Class I, Class II and Class III games. Class I gaming includes social games played for minimal prizes, or traditional ceremonial games. Class II gaming includes Bingo and Bingo-like games. Bingo is defined as games played for prizes, including monetary prizes, with cards bearing numbers or other designations in which the holder of the cards covers such numbers or designations when objects, similarly numbered or designated, are drawn or electronically determined, and in which the game is won by the first person covering a previously designated arrangement of numbers or designations on such cards. Class II gaming may also include pull tab games if played in the same location as Bingo games, lotto, punch boards, tip jars, instant Bingo, and other games similar to Bingo. Class III gaming includes any game that is not a Class I or Class II game, such as games of chance (slots, video poker, video blackjack, video Keno, and the like) typically offered in non-Indian, state-regulated casinos.

Two basic forms of Bingo exist. In traditional Bingo, the players purchase cards after which a draw takes place. The first player to achieve a designated pattern wins. In one type of Bingo game known as Bonanza Bingo, the draw for the game takes place before the players know the arrangements on their Bingo cards. After the draw occurs, the players may either purchase cards or expose previously purchased cards and compare the arrangements on the cards to the drawn numbers to determine whether predetermined patterns are matched. Play continues in Bonanza Bingo until at least one of the players matches a designated game-winning pattern. Bonanza Bingo may also encompass Bingo variations wherein a partial draw is conducted for some numbers (generally fewer than the number of balls expected to be necessary to win the game) prior to selling and/or revealing the Bingo cards. After the Bingo cards are sold and/or revealed, additional numbers are drawn until there is a winner.

As indicated above, a Bingo game is played until at least one player covers a predetermined game-winning pattern on the player's Bingo card. The game may also include interim winners of prizes based on matching predetermined interim patterns on the Bingo card using the same ball draw. The interim pattern wins do not terminate the Bingo game. For interim pattern awards, players covering certain interim patterns may receive an additional award as the game continues. Some exceptional Bingo versions may allow Bingo draws beyond those needed to achieve the Bingo game win so as to payout interim pattern wins at a desired rate. The game-winning awards may be partially or fully pari-mutuel in nature. That is, the Bingo win award is based upon the total amount wagered on a given occurrence of the Bingo game. However, interim pattern awards typically are not pari-mutuel.

For a given game-winning pattern, the expected number of balls drawn for at least one Bingo card to match the game-winning pattern depends on the number of Bingo cards being played in the Bingo game. Bingo is typically played with a variable number of Bingo cards resulting from varying numbers of players and players playing varying numbers of Bingo cards. Consequently, if the interim patterns are evaluated based on the balls drawn until at least one Bingo card matches the game-winning pattern, the odds of awarding interim awards also varies with the number of Bingo cards being played in the Bingo game. If the interim awards are determined based on the ball draw to Bingo, the Bingo game may be restricted to a fixed number of Bingo cards in order to achieve a desired payout rate for the interim pattern awards. However, it may be difficult to use a fixed number of Bingo cards in every occurrence of the Bingo game in a real-time environment wherein the players' expectation may be to play the Bingo game on demand.

For example, to achieve a desired interim award payout rate, it may be desirable to play each occurrence of the Bingo game with a fixed number of Bingo cards, such as fifteen. If there are at least two players but less than fifteen Bingo cards are enrolled in the Bingo game within a short period of time, in order to serve the players, the casino may want to start the game for those players available to play. With the fewer number of Bingo cards, the average number of balls drawn for at least one of the Bingo cards to match the game-winning pattern may be expected to be greater than for fifteen Bingo cards. Correspondingly, the number of balls used by the players to match the interim patterns increases, thereby increasing the odds of players matching the interim patterns and increasing the interim award payout rate. Therefore, a need exists for a method for minimizing the impact of the players and/or Bingo cards upon the award structure for a multi-player Bingo game, including the impact on the odds of awarding interim pattern awards.

In general, players may find games such as slot machines, whether electromechanical or video, to be more appealing to Bingo games. In other cases, players may prefer Bingo games to the exclusion of other games. Typically, slot machine outcomes are based upon the resultant patterns of symbols displayed on the reels. However, as mentioned above, slot machines and other similar type games of chance fall into the category of Class III games, which may be subject to stricter approval and regulation.

As such, there is a recognized need for providing a system wherein a Bingo outcome may be presented to the players with the display simulating the appearance of traditional Class III games, such as with electromechanical reels, but with the outcome of the Bingo game determining the outcome to be displayed instead of the game engine typically used for the selected Class III game. There is also a recognized need for granting the player the option of observing or obscuring an alternate outcome display that simulates a Class III game. For example, a Bingo outcome may be used to determine the positioning of the reels of a display device having the look and feel of a slot machine. Thus, the positioning of the slot reels is based upon the Bingo pattern(s) matched by the player during the Bingo game. Further, the award amounts depicted by the display device may correspond to the award amounts, plus any scatter and bonus awards, represented by the Bingo patterns. The display device, therefore, serves as an alternate display of the results of the Bingo game. The Bingo card, which may also be displayed, is the ultimate outcome-determining entity, with that outcome determining the outcome that is displayed on the display device. However, should the player prefer to play only the Bingo game, or prefer not to view the alternate display, the player should be granted the option of whether or not to view the alternate display of the results of the Bingo game.

For slot machines and other games of chance having a single payline (i.e. a single sequence or grouping of game symbols that is evaluated to determine whether a winning combination occurs), mapping between the winning outcomes of the game of chance and patterns in a Bingo game may not be difficult to achieve. Such games of chance typically encompass a couple dozen possible winning combinations and associated payout amounts. Selecting Bingo patterns with odds of occurrence similar to those of each desired winning outcome of the game of chance may be readily achieved by one skilled in the art.

The current trend in slot machines, for example, is to provide multi-line spinning reel games (i.e., multiple sequences or groupings of game symbols that are evaluated to determine whether one or more winning combinations occur). The award resulting from the final positioning of the reels may be the sum of the awards for all the selected paylines, plus any scatter or bonus awards. Thus, the number of possible award amounts for a given play of the game is increased dramatically and can easily reach several hundred.

SUMMARY OF THE INVENTION

In one aspect, the invention is directed to a gaming apparatus which may include a first outcome display device arranged to display an outcome of a first wagering game, a second outcome display device arranged to display an outcome of a second wagering game, the outcome of the second wagering game corresponding to the outcome of the first wagering game, and a cover device moveable between a first position wherein the outcome of the second wagering game is visible from an exterior of the gaming apparatus and a second position wherein the outcome of the second wagering game is not visible from the exterior of the gaming apparatus.

In another aspect, the invention is directed to a gaming apparatus for allowing a player to participate in a multi-player wagering game. The gaming apparatus may include a primary outcome display device, an alternate outcome display device, and a gaming apparatus controller operatively coupled to the primary outcome display device and the alternate outcome display device. The alternate outcome display device may include a rotatable reel and a cover variably disposed in front of the rotatable reel. The gaming apparatus controller may receive data relating to an outcome for the player for an occurrence of the multi-player wagering game, and cause the primary outcome display device to display the outcome for the player for the occurrence of the multi-player wagering game. The gaming apparatus controller may also determine an alternate outcome display corresponding to the outcome for the player for the occurrence of the multi-player wagering game, and cause the alternate outcome display devices to display the alternate outcome display. The gaming apparatus controller may further receive data relating to a display request. The gaming apparatus controller may cause the alternate outcome display device to dispose the cover to visibly obscure the rotatable reel from the player if the display request relates to a request to obscure the rotatable reel. The gaming apparatus controller may also cause the alternate outcome display device to dispose the cover to visibly display the rotatable reel for the player if the display request relates to a request to observe the rotatable reel.

In a further aspect, the invention is directed to a gaming apparatus for allowing a player to participate in a multi-player wagering game. The gaming apparatus may include a primary outcome display device, an alternate outcome display device, a first gaming apparatus controller operatively coupled to the primary outcome display device, and a second gaming apparatus controller operatively coupled to the alternate outcome display device and the first gaming apparatus controller. The alternate outcome display device may include a rotatable reel and a cover variably disposed in front of the rotatable reel. The first gaming apparatus controller may receive data relating to an outcome for the player for an occurrence of the multi-player wagering game, and cause the primary outcome display device to display the outcome for the player for the occurrence of the multi-player wagering game. The second gaming apparatus controller may determine an alternate outcome display corresponding to the outcome for the player for the occurrence of the multi-player wagering game, and cause the alternate outcome display devices to display the alternate outcome display. The second gaming apparatus controller may further receive data relating to a display request. The second gaming apparatus controller may cause the alternate outcome display device to dispose the cover to visibly obscure the rotatable reel from the player if the display request relates to a request to obscure the rotatable reel. The second gaming apparatus controller may also cause the alternate outcome display device to dispose the cover to visibly display the rotatable reel for the player if the display request relates to a request to observe the rotatable reel.

In a still further aspect, the invention is directed to a gaming apparatus for conducting a multi-player wagering game wherein each player may have a unique game array of game indicia for the occurrence of the wagering game and individual game indicia may be randomly selected from a range of available game indicia, and wherein one of the players may win the occurrence of the wagering game by matching a predetermined game winning pattern of game indicia on the player's unique game array with the randomly selected game indicia. The gaming apparatus may include an input device for inputting a plurality of input selections, a primary outcome display device, an alternate outcome display device, a gaming apparatus memory device, a currency-accepting mechanism that is capable of allowing a player to deposit a medium of currency, a value-dispensing mechanism that is capable of dispensing value to the player, and one or more gaming apparatus controllers operatively coupled to the input device, the primary outcome display device, the alternate outcome display device, the gaming apparatus memory device, the currency-accepting mechanism, and the value-dispensing mechanism.

At least one of the one or more gaming apparatus controllers may be programmed to allow the currency-accepting mechanism to accept a deposit of an amount of a medium of currency by a player at the gaming apparatus, to allow the input device to receive input for a player's wager on an occurrence of the wagering game at the input device, and to cause the primary display device to display the unique game array of game indicia for the player for the occurrence of the wagering game at the primary outcome display device of the gaming apparatus. At least one of the one or more gaming apparatus controllers may also be programmed to receive the randomly selected game indicia at the gaming apparatus, to compare the randomly selected game indicia to the game indicia of the game array in the order that the game indicia is selected, and to determine an outcome for the player for the occurrence of the multi-player wagering game based on the comparison of the randomly selected game indicia to the game indicia of the unique game array, wherein the outcome may be a winning outcome if a pattern formed by game indicia on the player's game array matching the randomly selected game indicia matches a predetermined at least one game award-winning pattern. Still further, at least one of the one or more gaming apparatus controllers may be programmed to cause the primary outcome display to display the outcome for the player for the occurrence of the multi-player wagering game, to determine an alternate outcome display corresponding to the outcome for the player for the occurrence of the multi-player wagering game. Yet further, at least one of the one or more gaming apparatus controllers may be programmed to receive data relating to a display request. At least one of the one or more gaming apparatus controllers may be programmed to cause the alternate outcome display device to dispose the cover to visibly obscure the rotatable reel from the player if the display request relates to a request to obscure the rotatable reel. At least one of the one or more gaming apparatus controllers may also be programmed to cause the alternate outcome display device to dispose the cover to visibly display the rotatable reel for the player if the display request relates to a request to observe the rotatable reel.

In another aspect, the invention is directed to a gaming apparatus for allowing a player to participate in a multi-player wagering game. The gaming apparatus may include a first display unit, a second display unit, and a controller operatively coupled to the first display unit and the second display unit. The second display unit may include an outer rotatable reel and an inner rotatable reel independently rotatable inside the outer rotatable reel. The outer rotatable reel may include a transparent cover portion and an opaque cover portion The controller may receive data relating to a first outcome for the player for an occurrence of the multi-player wagering game, and cause the first display unit to display the first outcome for the player for the occurrence of the multi-player wagering game. The controller may also determine a second outcome display corresponding to the first outcome for the player for the occurrence of the multi-player wagering game, and cause the second display unit to display the second outcome. The controller may further receive data relating to a display request. The controller may cause the second display unit to rotate the outer rotatable reel to dispose the opaque cover portion in front of the inner rotatable reel if the display request relates to a request to obscure the second outcome display. The controller may cause the second display unit to rotate the outer rotatable reel to dispose the transparent cover portion in front of the inner rotatable reel if the display request relates to a request to observe the second outcome display.

In yet another aspect, the invention is directed to a gaming method which may include determining an outcome of a first wagering game, determining an outcome of a second wagering game corresponding to the outcome of the first wagering game, displaying the outcome of the first wagering game at a first display device, displaying the outcome of the second wagering game at a second display device, and preventing the display of the outcome of the second wagering game in response to receiving an input from a player to not display the outcome of the second wagering game.

In a still further aspect, the invention is directed to a method for conducting a multi-player wagering game over a gaming network having a plurality of gaming apparatus, wherein a player participates in the multi-player wagering game at one of the gaming apparatus. The method may include determining an outcome for the player for an occurrence of the multi-player wagering game, displaying the outcome for the player for the occurrence of the multi-player wagering game at the gaming apparatus, determining an alternate outcome display corresponding to the outcome for the player for the occurrence of the multi-player wagering game, displaying the alternate outcome display at an alternate outcome display device, receiving data relating to a display request, disposing a cover to visibly obscure the alternate outcome display from the player if the display request relates to a request to obscure the alternate outcome display, and disposing the cover to visibly display the alternate outcome display for the player if the display request relates to a request to observe the alternative outcome display.

In a yet further aspect, the invention is directed to a method for conducting a multi-player wagering game over a gaming network having a plurality of gaming apparatus, wherein each player may have a game array having a unique combination of indicia from a range of game indicia for an occurrence of the wagering game, wherein individual game indicia may be randomly selected from the range of game indicia during the occurrence of the wagering game, and wherein at least one of the players may win the occurrence of the wagering game by matching a predetermined game-winning pattern of game indicia on the player's game array with the randomly selected game indicia. The method may include receiving a deposit of an amount of a medium of currency by a player at a gaming apparatus, receiving input for a player's wager on an occurrence of the multi-player wagering game at the input device, displaying the unique game array of game indicia for the player for the occurrence of the multi-player wagering game at the gaming apparatus, receiving the randomly selected game indicia at the gaming apparatus, comparing the randomly selected game indicia to the game indicia of the game array in the order that the game indicia are selected, determining an outcome for the player for the occurrence of the multi-player wagering game based on the comparison of the randomly selected game indicia to the game indicia of the unique game array, wherein the outcome is a winning outcome if a pattern formed by game indicia on the player's game array matching the randomly selected game indicia matches a predetermined at least one game award-winning pattern, displaying the outcome for the player for the occurrence of the multi-player wagering game at the gaming apparatus, determining an alternate outcome display corresponding to the outcome for the player for the occurrence of the multi-player wagering game, displaying the alternate outcome display at an alternate outcome display device at the gaming apparatus, receiving data relating to a display request, disposing a cover to visibly obscure the alternate outcome display from the player if the display request relates to a request to obscure the alternate outcome display, and disposing the cover to visibly display the alternate outcome display for the player if the display request relates to a request to observe the alternative outcome display.

Additional aspects of the invention are defined by the claims of this patent.

BRIEF DESCRIPTION OF THE DRAWINGS

FIG. 8-10 are illustrations of visual displays that may be displayed during the performance of the multi-player Bingo game routine of FIGS. 7A and 7B.

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '__________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
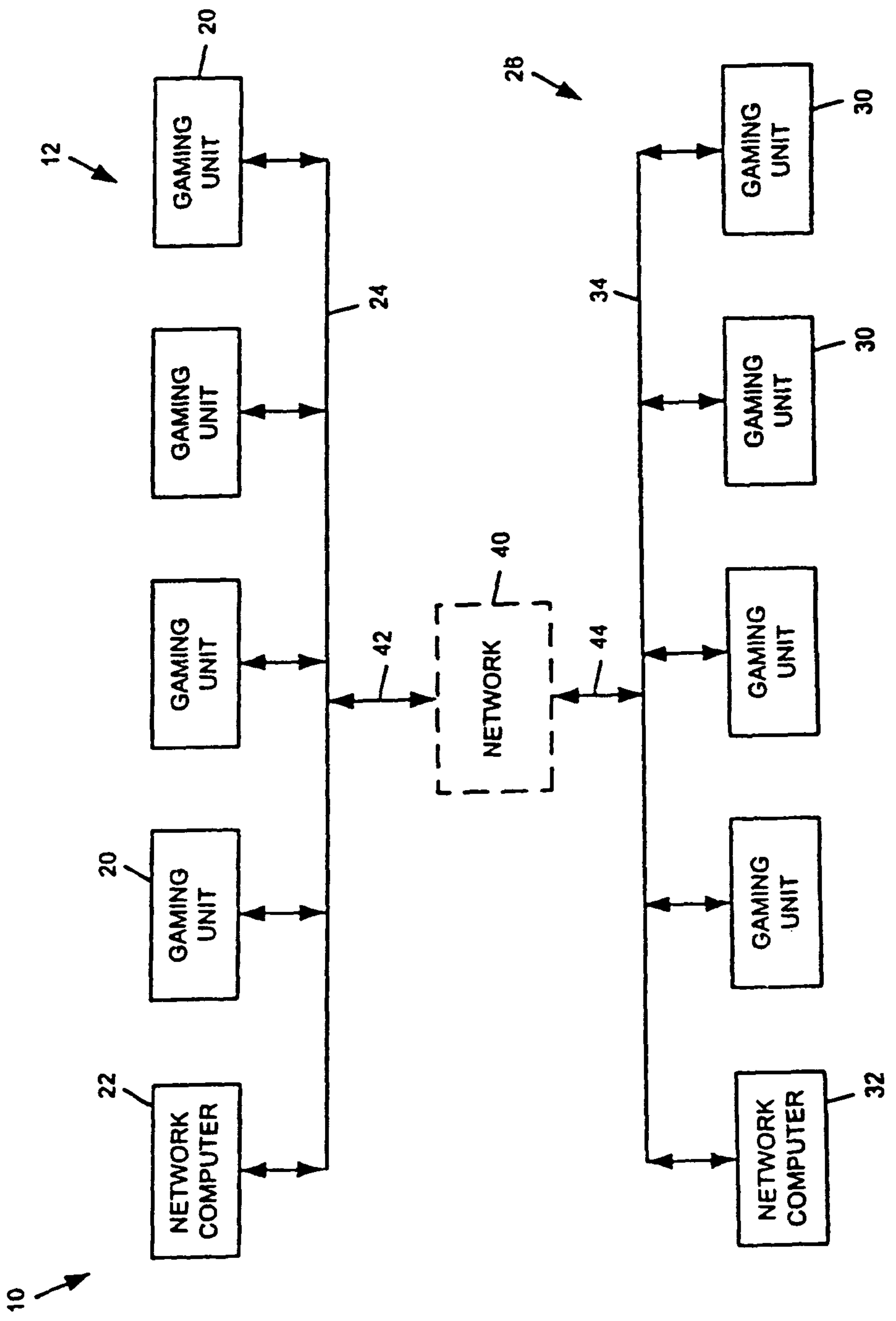
FIG. 1 is a block diagram of an embodiment of a gaming system in accordance with the invention.

FIG. 1 illustrates one possible embodiment of a Bingo gaming system 10 in accordance with the invention. Referring to FIG. 1, the Bingo gaming system 10 may include a first group or network 12 of casino gaming units 20 operatively coupled to a network computer 22 via a network data link or bus 24. The Bingo gaming system 10 may include a second group or network 26 of casino gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be configured to control the execution of a multi-player Bingo game played at a plurality of the gaming units 20, and to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may provided as a dedicated hardwired link or a wireless link. Although the data link 24 is shown as a single data link 24, the data link 24 may comprise multiple data links.

Figure 2:
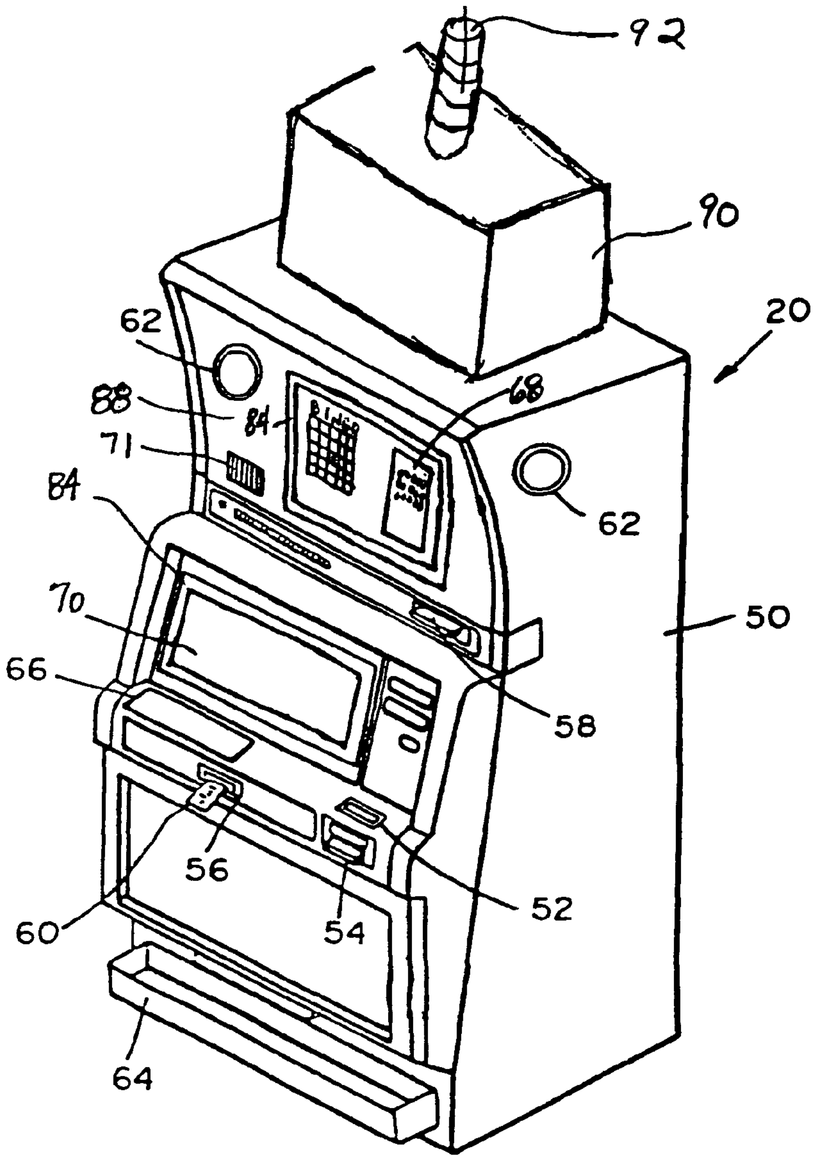
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 2, the casino gaming unit 20 may include a housing or cabinet 50 and one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term "value" may encompass gaming tokens, coins, paper currency, ticket vouchers, credit or debit cards, smart cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader, an optical card reader or a rewritable thermal card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player's gaming habits, etc.

The gaming unit 20 may include one or more audio speakers 62, a coin return tray 64, an input control panel 66, upper and lower display units 68, 70 for displaying images relating to the game or games provided by the gaming unit 20, a status display 71 for providing player information, such as number of credits remaining, and a light device, such as, for example, illuminated light bezels 84, a lighted topbox 88, a topper 90, and a lighted gaming candle 92, as are well known in the art. The display unit 68 may be color video display capable of displaying graphical images associated with the game or games offered at the gaming unit 20. The display unit 70 may be a mechanical or electromechanical device configured to display game outcomes or other graphics associated with the game(s), such as for slot reels or wheels controlled by stepper motors, or any other desired mechanism. For example, the display unit 68 may display images associated with the multi-player Bingo game, while the display unit 70 may display an alternate presentation of the outcome of the Bingo game in the form of another casino game, such as slots. The lower display unit 70 may also include a video display unit in addition to a mechanical or electromechanical display. Alternatively, both of the displays 68, 70 may be mechanical or electromechanical devices, or both of the display 68, 70 may include video display units. Moreover, the displays 68, 70 may be combined into a single video display device, such as a CRT, LCD or electromechanical device.

The audio speakers 62 may generate audio representing sounds such as the noise of spinning slot machine reels, a dealer's voice, music, announcements or any other audio related to a casino game. The input control panel 66 may be provided with a plurality of pushbuttons as shown or as touch-sensitive areas in cabinet 50 or on displays 68, 70 where implemented with video displays with touch-sensitive screens or other input devices that may be pressed or otherwise actuated by a player to select games, make wagers, make gaming decisions, etc. The status display 71 may provide gaming information to the player, such as the number of credits remaining, the outcome of the current game, the payout schedule, or the like. The light bezel(s) 84 may be coupled to the front face of the cabinet 50 and may enclose a plurality of lights, and further may have an aperture, allowing the display unit 70 to be visible therethrough. The lighted topbox 88, the topper 90, and the lighted gaming candle 92 may be stylistic elements added to the gaming unit 20 to attract a player's attention, or to provide visual cues to gaming status.

Figure 2A:
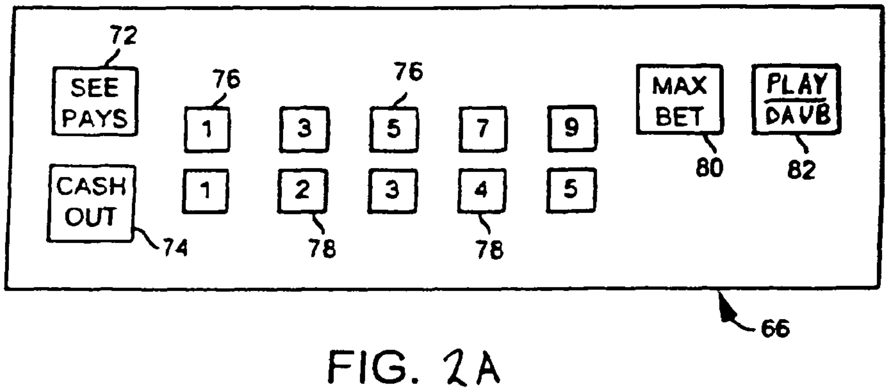
FIG. 2A illustrates an embodiment of a control panel for a gaming unit.

FIG. 2A illustrates one possible embodiment of the control panel 66, which may be used where the gaming unit 20 is a slot machine having a plurality of mechanical or "virtual" reels. Referring to FIG. 2A, the control panel 66 may include a "See Pays" button 72 that, when activated, causes the display unit 68 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the coin return tray 64.

For the multi-player Bingo game, the control panel of the gaming unit 20 may be provided with a plurality of selection buttons 76, each of which may allow the player to select a different number of Bingo cards to play prior to enrolling in the Bingo game. For example, five buttons 76 may be provided, each of which may allow a player to select one, three, five, seven or nine Bingo cards. Alternatively, where multiple sets of interim patterns are provided as described in more detail below, buttons 76 may allow a player to select one of the available interim pattern sets for use in the Bingo game, each of which may correspond to a different wager amount. The control panel 66 may further be provided with a plurality of selection buttons 78 each of which allows a player to specify a wager amount for each Bingo card selected, or for each interim pattern within a selected pattern set. For example, if the smallest wager accepted by the gaming unit 20 is a quarter ($0.25), the gaming unit 20 may be provided with five selection buttons 78, each of which may allow a player to select one, two, three, four or five quarters to wager for each Bingo card selected, or for each interim pattern in a selected pattern set. In that case, if a player were to activate the "5" button 76 (meaning that five Bingo cards were to be played in the Bingo game, or that a interim pattern set requiring a five credit wager was selected) and then activate the "3" button 78 (meaning that three coins per Bingo card or interim pattern were to be wagered), the total wager would be $3.75 (assuming the minimum bet was $0.25).

If the gaming unit 20 provides, for example, a slots display having a plurality of reels and a plurality of paylines which define winning combinations of reel symbols, the plurality of selection buttons 76 on the control panel 66 may allow the player to select a different number of paylines prior to spinning the reels. For example, five buttons 76 may be provided, each of which may allow a player to select one, three, five, seven or nine paylines. Further, the plurality of selection buttons 78 on the control panel 66 may further allow a player to specify a wager amount for each payline selected. The total wager amount calculation above may apply equally to the slot display where a player activates the "5" button 76 to wager on five paylines, and activates the "3" button 78 to wager three coins per payline. Ultimately, however, the selections made for the alternate display, such as the slots display, translate into a Bingo game wager.

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. Depending on the implementation, the gaming unit 20 may be configured such that a player entered in the next occurrence of the Bingo game when the "Max Bet" button is pressed by the player. The control panel 66 may include a "Play/Daub" button 82 to allow the player to enter or enroll in the next occurrence of the Bingo game and to initiate spinning of the reels of a slots game after a wager has been made, and to "daub" or mark the player's Bingo card during the Bingo game as described more fully below. Alternatively, the gaming unit 20 may be configured with separate "Play" and "Daub" buttons.

In FIG. 2A, a rectangle is shown around the buttons 72, 74, 76, 78, 80, 82. It should be understood that that rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. Although the control panel 66 is shown to be separate from the display units 68, 70, it should be understood that the control panel 66 could be generated by the display unit 68 or the display unit 70, if provided with a video display unit. In that case, each of the buttons of the control panel 66 could be a colored area generated by the display unit 68 and/or 70, and some type of mechanism may be associated with the display unit 68 and/or 70 to detect when each of the buttons was touched, such as a touch-sensitive screen.

Gaming Unit Electronics

Figure 3A:
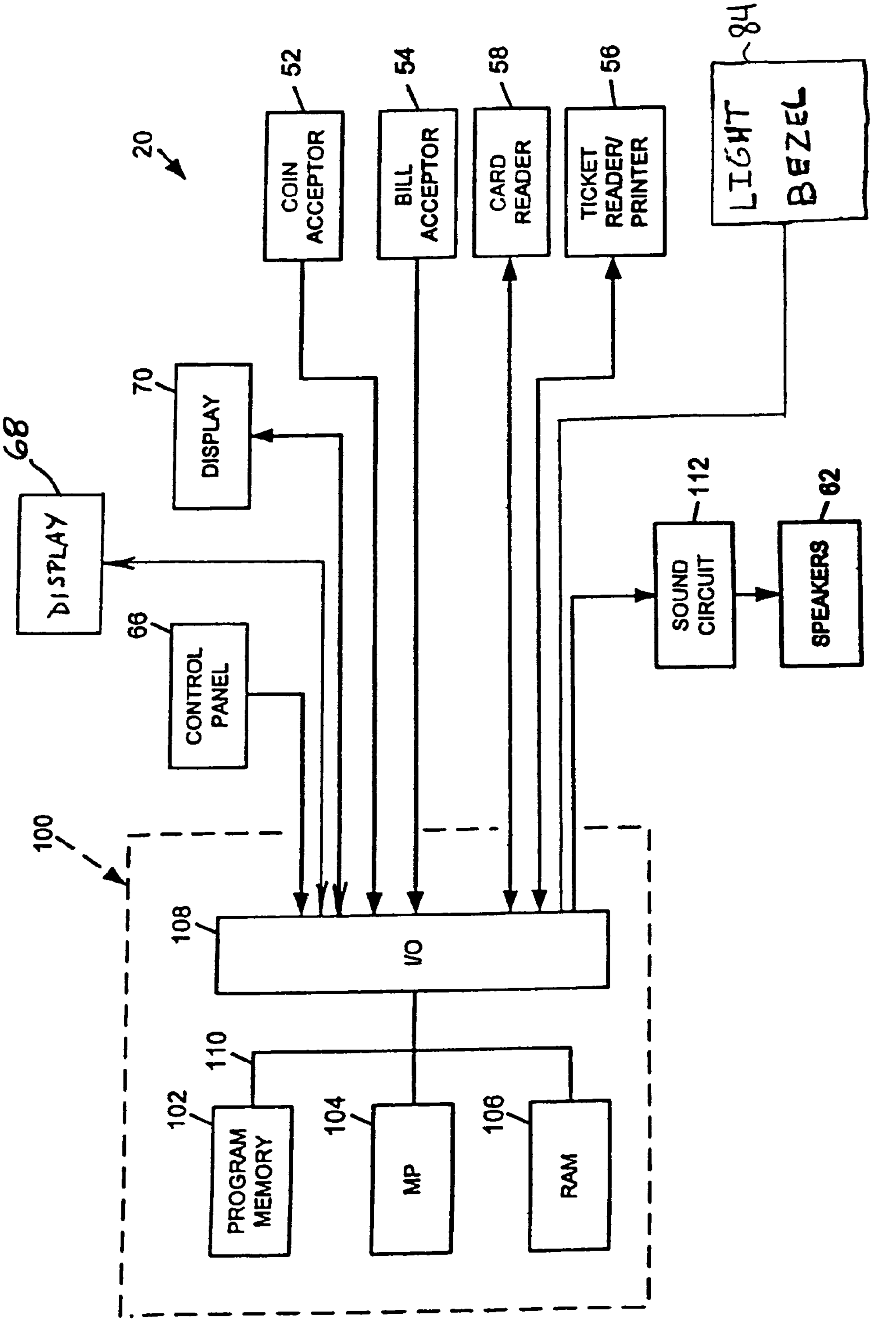
FIG. 3A is a block diagram of the electronic components of the gaming unit of FIG. 2.

FIG. 3A is a block diagram of a number of components that may be incorporated in the gaming unit 20 or alternatively, the network computer 22. Referring to FIG. 3A, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

Although the program memory 102 is shown in FIG. 3A as a read-only memory (ROM) 102, the program memory of the controller 100 may be a read/write or alterable memory, such as a hard disk. In the event a hard disk is used as a program memory, the address/data bus 110 shown schematically in FIG. 3A may comprise multiple address/data buses, which may be of different types, and there may be an I/O circuit disposed between the address/data buses.

FIG. 3A illustrates that the control panel 66, the coin acceptor 52, the bill acceptor 54, the card reader 58 and the ticket reader/printer 56 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 3A, the components 52, 54, 56, 58, 66, 68, 70, 84 and 112 may be connected to the I/O circuit 108 via a respective direct line or conductor. Different connection schemes could be used. For example, one or more of the components shown in FIG. 3A may be connected to the I/O circuit 108 via a common bus or other data link that is shared by a number of components. Furthermore, some of the components may be directly connected to the microprocessor 104 without passing through the I/O circuit 108. Moreover, while not illustrated in the figures, the components 71, 88, 90 and 92 may also be operatively coupled to the controller 100. For example, the components 71, 86, 88, 90 and 92 may be connected to the I/O circuit 108 via a respective direct line or other similar connection scheme.

Figure 3B:
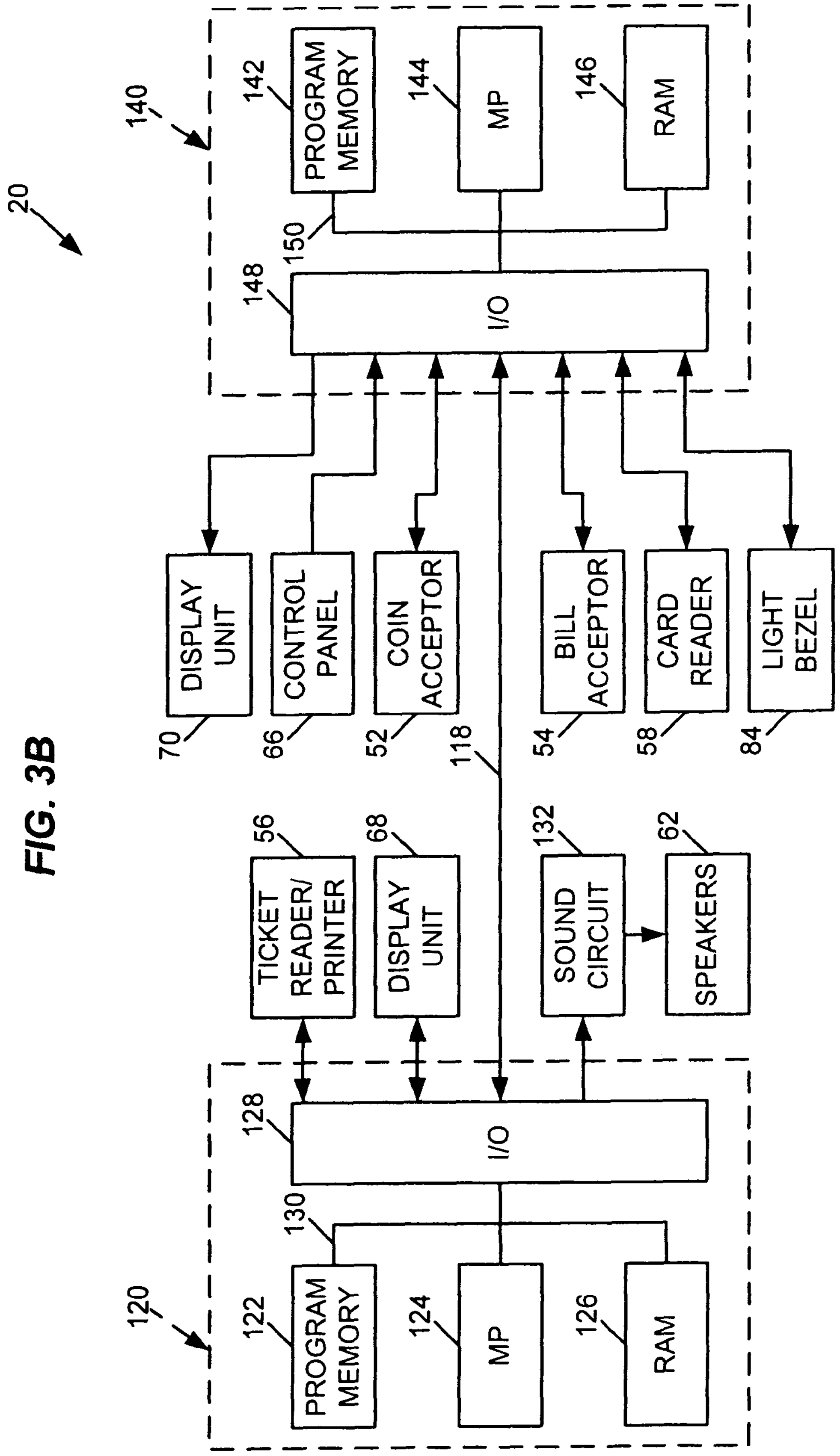
FIG. 3B is a block diagram of another embodiment of the electrical components of the gaming unit of FIG. 2.

FIG. 3B is a block diagram of an alternative embodiment to incorporate a number of components in the gaming unit 20 and/or the network computer 22. Referring to FIG. 3B, the gaming unit 20 may include a first controller 120 operatively coupled to a second controller 140 via a data link or bus 118. The first controller 120 may include a program memory 122, a microcontroller or microprocessor (MP) 124, a random-access memory (RAM) 126 and an input/output (I/O) circuit 128, all of which may be interconnected via an address/data bus 130. As above, the controller 120 may include multiple microprocessors 124, multiple RAMs 106, multiple program memories 122, and a number of different types of I/O circuits 128. Likewise, the second controller 140 may include a program memory 142, a microcontroller or microprocessor (MP) 144, a random-access memory (RAM) 146 and an input/output (I/O) circuit 148, all of which may be interconnected via an address/data bus 150. The RAM(s) 126, 146 and program memories 122, 142 may be implemented as semiconductor memories, magnetically readable memories, and/or optically readable memories, for example. One or both of the controllers 120, 140 may be operatively coupled to the network computer 22 via the data link 24.

The ticket reader/printer 56 and the upper display unit 68 may be operatively coupled to the first controller 120 by either a unidirectional or bidirectional, single-line or multiple-line data link. The speaker(s) 62 may be operatively coupled to a sound circuit 132, which, in turn, may be coupled to the I/O circuit 128. As shown in FIG. 3A, the components 56, 68 and 132 may be connected to the I/O circuit 128 via a respective direct line or conductor, though different connection schemes could be used such as a common bus or other data link that is shared by a number of components. Furthermore, some of the components may be directly connected to the microprocessor 124.

The second controller 140 may be operatively coupled to the coin acceptor 52, the bill acceptor 54, the card reader 58, the control panel 66, the lower display unit 70 and the light bezel 84. The components 52, 54, 58, 66, 70 and 84 may be connected to the I/O circuit 148 via a respective direct line or conductor, and via different connection schemes such as a common bus or other data link that is shared by a number of components. Some of the components may also be directly connected to the microprocessor 144 without passing through the I/O circuit 148.

Although not illustrated in the figures, the components 71, 88, 90 and 92 may also be operatively coupled to the first controller 120 via the I/O circuit 128. For example, the components 71, 86, 88, 90 and 92 may be connected to the I/O circuit 128 via a respective direct line or other similar connection scheme. One or more of the components 71, 86, 88, 90 and 92 may likewise be operatively coupled to the second controller 140. The components 52, 54, 58, 66 and 84 may also be operatively coupled to the first controller 120, in addition to or as an alternative to, being coupled to the second controller 140. Likewise, the components 56 and 62 may be operatively coupled to the second controller 140.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C++, C#, Java or the like or any low-level assembly or machine language. By storing the computer program portions therein, various portions of the memories 102, 106 are physically and/or structurally configured in accordance with computer program instructions.

Network Computer/Server Electronics

Figure 4:
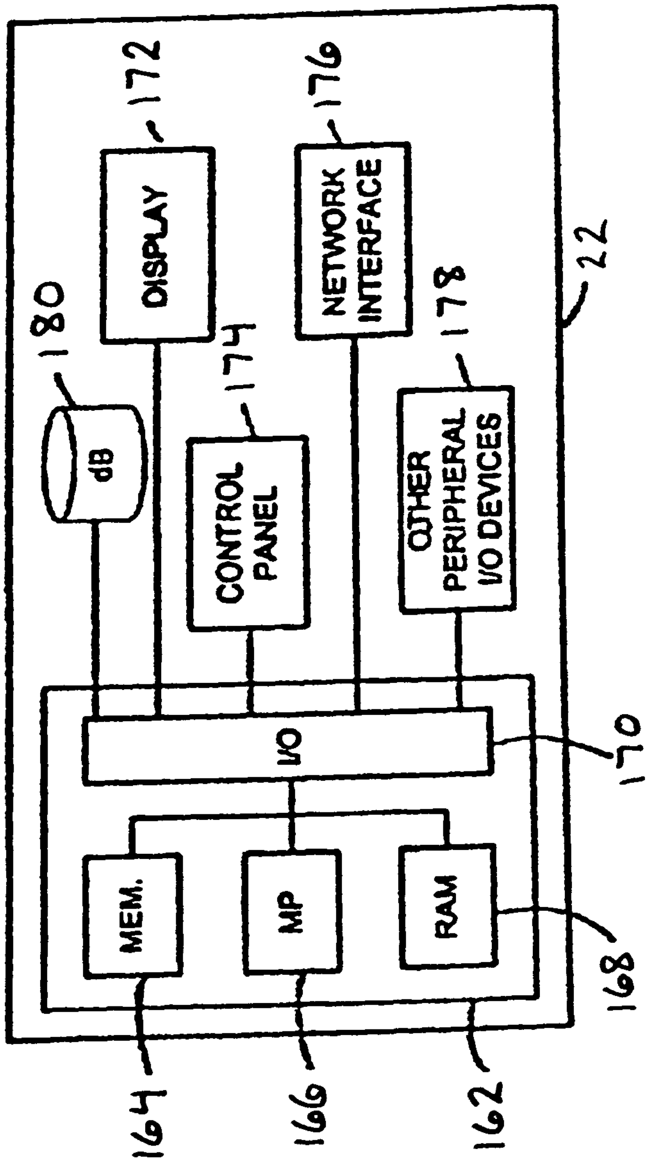
FIG. 4 is a block diagram of the electronic components of a network computer of FIG. 1.

The network 40, and hence the individual gaming units 20, 30, may be communicatively connected to network computers or servers 22, 32. Using network computer 22 as an example, the network computer 22 may be a single networked computer, or a series of interconnected computers having access to the network 10 via a gateway or other known networking system. Referring to FIG. 4, generally, the network computer 22 may include a central gaming controller 162 configured to manage, execute and control the individual gaming units 20, 30 and the routines used to play the multi-player Bingo games. The network computer 22 may include a memory 164 for storing programs and routines, a microprocessor 166 (MP) for executing the stored programs, a random access memory 168 (RAM) and an input/output bus 170 (I/O). The memory 164, microprocessor 166, RAM 168 and the I/O bus 170 may be multiplexed together via a common bus, as shown, or may each be directly connected via dedicated communications lines, depending on the needs of the network 10.

Further, the network computer 22 may be directly connected, hardwired, or indirectly connected through the I/O bus 170 to external components such as a display 172, a control panel 174, a network interface device 176 and other peripheral I/O devices 178. Examples of other peripherals device include, but are not limited to, storage devices, wireless adaptors, printers, and the like. In addition, a database 180 may be communicatively connected to the central gaming controller 162 and provide a data repository for the storage and correlation of information gathered from the individual gaming units 20, 30. The information stored within the database 180 may be information relating to individual gaming units 20, 30 such as gaming unit-specific information like a gaming unit identification code and/or location code. The database 180 may further include casino game specific information such as the total amounts wagered and paid out, game outcomes, player selection history information, and the like.

Stepper Reel Assembly

Figure 5A:
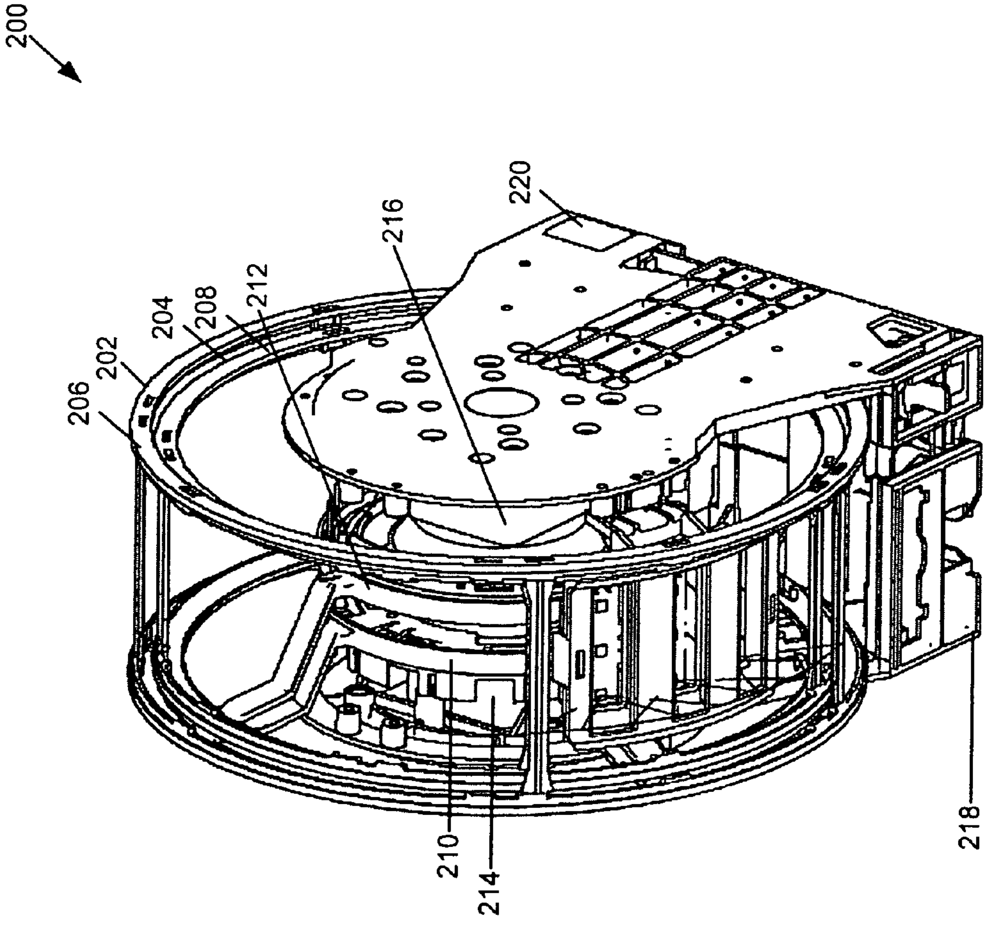
FIG. 5A is a perspective view of an embodiment of a reel assembly for the gaming unit of FIG. 2.
Figure 5B:
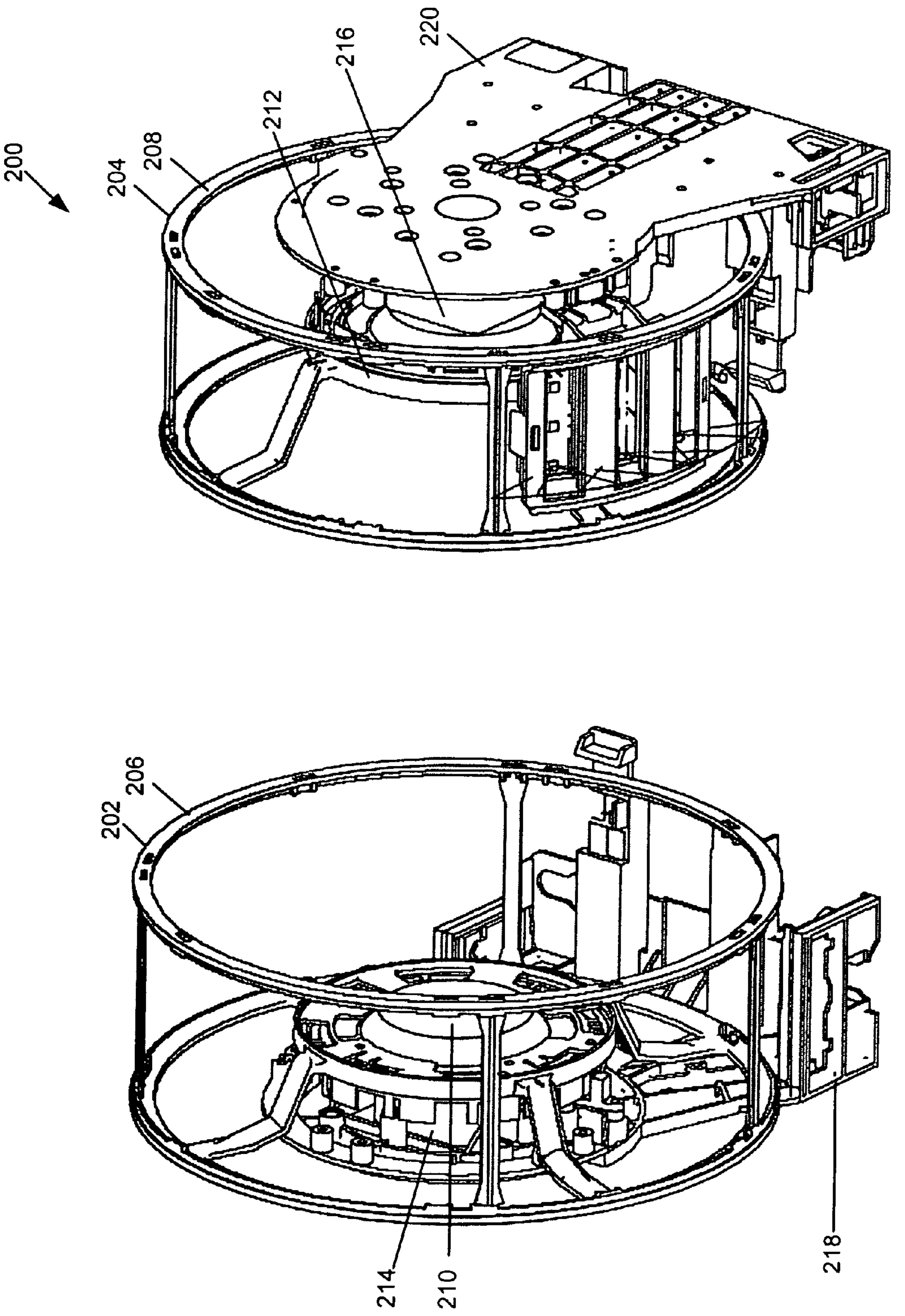
FIG. 5B is an exploded perspective view of the reel assembly of FIG. 5A.
Figure 5C:
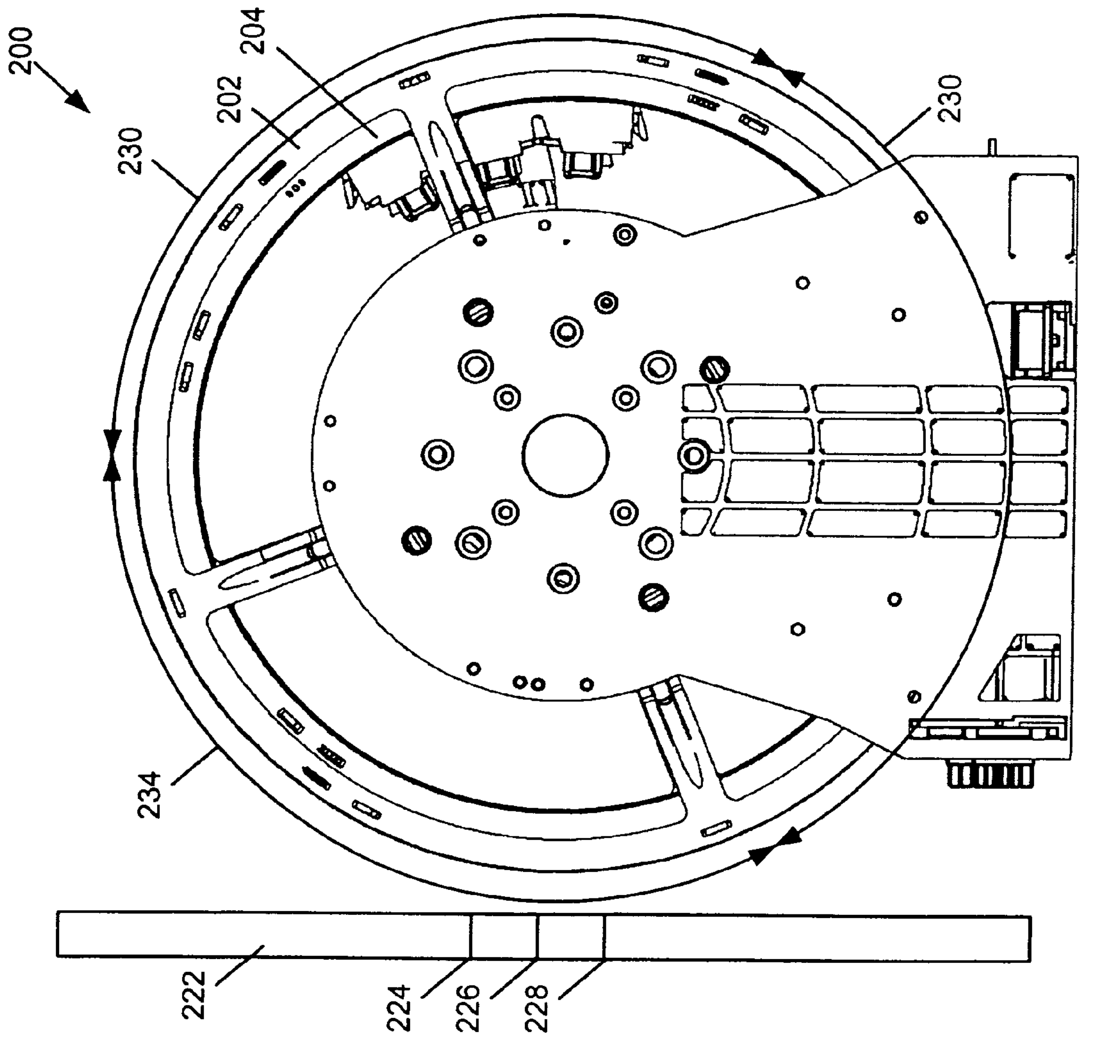
FIG. 5C is a side view of the reel assembly of FIG. 5A.

FIG. 5A is a perspective view, FIG. 5B is an exploded perspective view and FIG. 5C is a side view of one possible embodiment of a reel assembly 200 of the lower display unit 70. Although only one reel assembly 200 is shown, it should be understood that the display unit 70 may include several rotatable reel assemblies 200, or slot reels, each of which may be controlled by a stepper motor. In one example, the reel assembly 200 is a mechanical, rotatable slot reel.

Referring to FIGS. 5A-5C, the stepper reel assembly 200 may include a cover variably disposed in front of a rotatable reel, such that different portions of the cover may be disposed in front of the rotatable reel at different times. As described further below, the cover may be disposed to visibly obscure the rotatable reel such that a player is unable to view the rotatable reel and the symbols thereon, or the cover may be disposed to visibly display the rotatable reel such that the player may view the rotatable reel and the symbols thereon.

In one example, the cover and the rotatable reel are provided as concentric mechanical rotatable slot reels. The concentric reels may include an outer rotatable reel 202 and an inner rotatable reel 204. The inner rotatable reel 204 may be disposed inside the outer rotatable reel 202 and may be capable of rotating about an axis independent of the outer rotatable reel 202. Likewise, the outer rotatable reel 202 may be capable of rotating about an axis independent of the inner rotatable reel 204. In one example, the outer rotatable reel 202 and the inner rotatable reel 204 may rotate on a common axis, though independent of one another. Each of the rotatable reels 202, 204 may include a circumferential frame 206, 208, respectively. As described further below, a reel strip, also referred to as a peripheral face, may be mounted on each of the circumferential frames 206, 208.

Each rotatable reel 202, 204 may include a mounting plate 210, 212 integrally formed with the outer circumferential frames 206, 208. The mounting plates 210, 212 may each be independently coupled to a shaft of a stepper reel motor 214, 216, respectively. Each stepper reel motor 214, 216 may independently rotate its corresponding reel and stop its corresponding reel in a position determined by the controller 100. Alternatively, if multiple controllers are utilized as described above, the stepper reel motors 214, 216 may be operatively coupled to the second controller 140 which may cause the reels to rotate and stop in response to data received from the first controller 120 or in response to a player input from the control panel 66.

The reel assembly 200 may further include mounting brackets 218, 220. The stepper motors 214, 216 may be fixed to the mounting brackets 218, 220, respectively. The mounting brackets 214, 216 may be utilized to securely and independently mount each reel 202, 204 inside the housing 50 of the gaming unit 20. In one example, the mounting brackets 214, 216 may be affixed to a base plate within the housing 50. The reel assembly 200 may be mounted behind a display glass 222 positioned in the housing 50 of the gaming unit 20. The display glass 222 may include one or more paylines 224, 226, 228 disposed thereon. As described further below, the outer rotatable reel 202 may be utilized as a variable cover, and may include a peripheral face having a plurality of cover portions. As seen best in FIG. 5C, the outer rotatable reel 202 may include three viewing zones 230, 232, 234 corresponding to various cover portions, such as a transparent cover portion, an opaque cover portion, and an instructional cover portion, each of which may be rotated to a position behind the display glass 222 and in front of the inner rotatable reel 204 by rotating the outer rotatable reel 202. Further examples of concentric mechanical reels are disclosed in U.S. Pat. Nos. 5,395,111 and 5,752,881 which are expressly incorporated by reference herein.

Figure 5D:
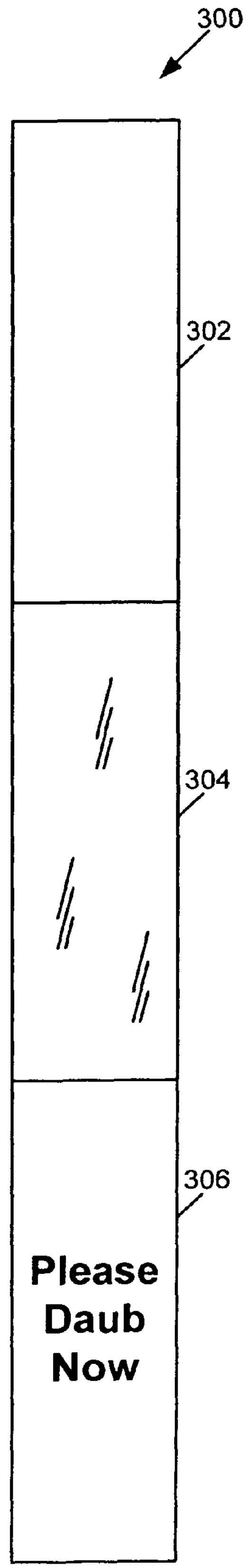
FIGS. 5D and 5E are illustrations of reel strips for the reel assembly of FIG. 5A.

FIG. 5D is a schematic diagram illustrating a possible embodiment of an outer reel strip 300 for the outer rotatable reel 202. The outer reel strip 300 may be mounted on the circumferential frame 206 of the outer rotatable reel 202. As shown in FIG. 5D, only one outer reel strip 300 is depicted, though the number of reel strips may be in proportion to the number of reel assemblies 200 being utilized in the lower display unit 70 and/or the number of outer rotatable reels 202 being utilized. In one example, a single outer rotatable reel 202, and hence a single reel strip, may act as a variable cover disposed over multiple inner reels 204, whereas in another example multiple outer rotatable reels 202, and hence multiple reel strips may be utilized.

The outer reel strip 300 may be divided into multiple cover portions. As shown in FIG. 5D, the outer reel strip 300 is evenly divided into three cover portions, including an opaque cover portion 302, a transparent cover portion 304 and a cover portion 306 with instructions disposed thereon. It should be understood that additional instructions in place of, or in addition to, a daub prompt may be provided on the outer reel strip. For example, a cover portion corresponding to instructions to enroll in the multi-player Bingo game, deposit currency, win/lose, etc. may be provided for corresponding aspects of the multi-player Bingo game.

Generally, each cover portion 302, 304, 306 may be sized to cover the displayable area of the peripheral face of the inner rotatable reel 204. For example, in a lower display unit 70 having a displayable area of five reels and three rows, each cover portion 302, 304, 306 may be sized to cover the three rows of each reel 200. However, it should be understood that more or less than three cover portions may be utilized, and each cover portion may vary in size or shape. For example, the outer reel strip 300 may include two cover portions, a transparent cover portion and an opaque cover portion. Alternatively, the outer reel strip 300 may include four cover portions, including the transparent cover portion, the opaque cover portion, a transparent cover portion with instructions and an opaque cover portion with instructions.

The outer reel strip 300 may be formed of lightweight durable resin material, though it should be understood that the outer reel strip 300 may be formed of other materials, such as other resins, metal, glass, ceramics, or combinations thereof. The opaque portion 302 and the instructional portion 306, may be printed on a transparent resin film. The opaque portion 302 may be colored to obscure any image on the peripheral face of the inner rotatable reel 204. The opaque portion 302 may be of any pattern, image or color that obscures the inner rotatable reel 204 from the player's view when disposed in front of the inner rotatable reel 204. The instructional cover portion 306 may be formed with opaque alphanumeric characters or symbols drawn on the peripheral face with the remainder of the instructional portion 306 being transparent. Alternatively, the instructional cover portion 306 may include an opaque background, as with the opaque cover portion 302, with the instructions drawn thereon. The transparent cover portion 304 may be formed in the peripheral face without any modification to the film. However, in another example, the transparent cover portion 304 may include images formed therein, such as a border or translucent images, that permit viewing of the inner reel 204. Images may also be provided on the opaque cover portion 302.

Figure 5E:
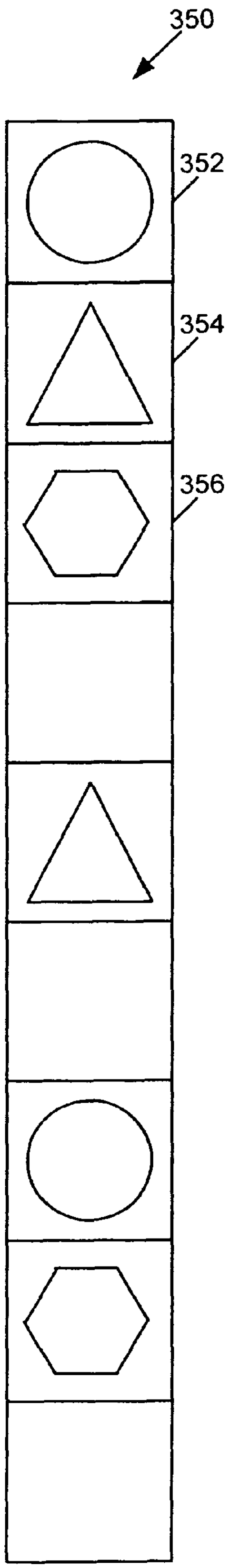

FIG. 5E is a schematic diagram illustrating a possible embodiment of a inner reel strip 350 for the inner rotatable reel 204. The inner reel strip 350 may be mounted on the circumferential frame 208 of the inner rotatable reel 204. As shown in FIG. 5E, only one inner reel strip 350 is depicted, though the number of reel strips may be in proportion to the number of reel assemblies 200 being utilized in the lower display unit 70. The inner reel strip 350 may be formed from a lightweight durable resin material, though other materials may also be utilized. Generally, the resin material may be an opaque film, with a variety of reel symbols 352, 354, 356 arranged along the inner reel strip 350. In particular, the reel symbols 352, 354, 356 may be arranged to simulate the various permutations for the outcomes of the game utilized for the alternate outcome display. As will be understood, various reel symbols and various numbers of symbols may be arranged along the inner reel strip 350.

As described further below, the peripheral face of the inner rotatable reel 204, and any images thereon, is generally visible through the transparent cover portion 302 and obscured by the opaque cover portion 304. The cover portion that is disposed in front of the inner rotatable reel 202 may depend on a player request as represented by data received by the controller 100, or the controller 140. The player request may reflect a player's preference to observe the inner rotatable reels 202 or to obscure the inner rotatable reels 202. In other words, the player request may reflect a player's desire of whether or not to view an alternate presentation of the outcome of the Bingo game. The particular cover portion disposed in front of the inner rotatable reel 202 may further depend on the outcome of the Bingo game.

Although the variable cover has been described above as including a circumferential frame having a circular cross section, it should be understood that the cover is not limited thereto. For example, the variable cover may be provided as an outer rotatable cover that includes a frame having a sector of a circle as a cross section (i.e., a cross-section bounded by two radii and an arc of a circle) and a perimeter frame extending from the sector frame. An opaque cover portion 302 may be provided as a peripheral surface along the perimeter frame or wall to visibly obscure the inner rotatable reel 204. One or more instructional cover portions 306 may also be provided along the arc of the sector. However, instead of a transparent cover portion 304, the opening left by the sector may be disposed in front of the inner rotatable reel 202 to visibly display the inner rotatable reel 202.

Alternate Display Operation

Figure 6A:
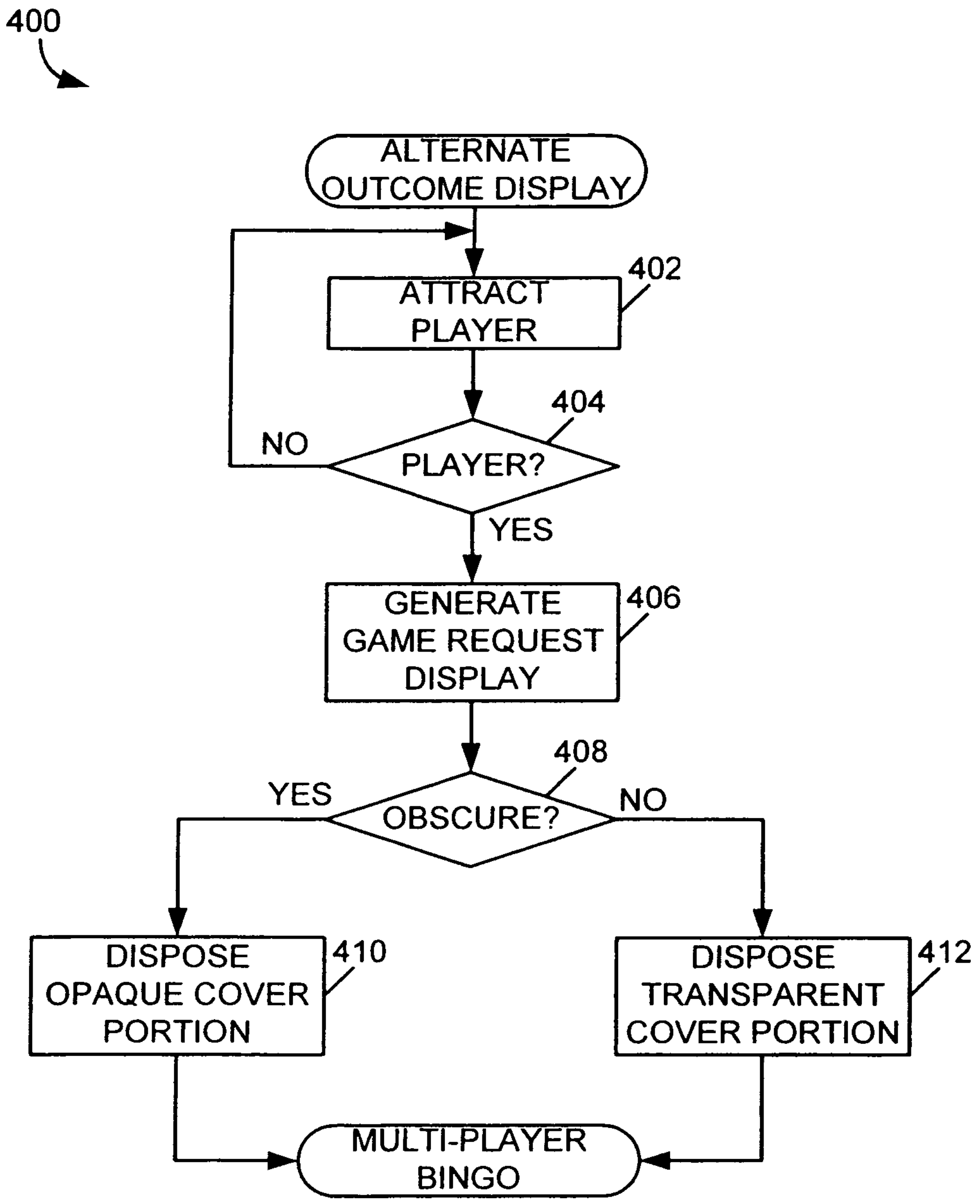
FIG. 6A is a flowchart of an alternate outcome display routine that may be performed by the gaming unit.

FIG. 6A is a flowchart of an alternate display routine 400 which may be stored in the memory of a gaming unit 20 to allow a player to observe or obscure the alternate display outcome of the lower display unit 70. The routine 400 may be performed by the controller 100, or, in the case of multiple controllers, may be performed by the second controller 140. Generally, the routine 400 may be performed prior to a player enrolling in a multi-player Bingo game, though a similar routine may be performed at any time during the occurrence of the multi-player Bingo game, as described further below. Referring to FIG. 6A, the alternate display routine 400 may begin operation at block 402 during which an attraction sequence may be performed in an attempt to induce a potential player in a casino to play the gaming unit 20. The attraction sequence may be performed by displaying one or more video images on the display unit 68 (if provided as a video display unit) and/or causing one or more sound segments, such as voice or music, to be generated via the speakers 62.

During performance of the attraction sequence, if a potential player makes any input to the gaming unit 20 as determined at block 404, the attraction sequence may be terminated and a display may be generated on the display unit 68 or the display unit 70 (if provided as a video display unit) at block 406 to allow the player to enroll in a multi-player Bingo game. The gaming unit 20 may detect an input at block 404 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; etc.

The display generated at block 406 may include, for example, instructions to request participation in a multi-player Bingo game. The display generated at block 406 may further include a list of Bingo games that may be played on the gaming unit 20 and/or a visual message to prompt the player to deposit value into the gaming unit 20 to enroll in the multi-player Bingo game. In addition, the display may include a message prompting the player for a selection regarding the display of the alternate outcome display on the lower display unit 70. The display at block 406 may include a touch-screen option (if the display unit 68 or 70 is provided with a touch-screen) to view or obscure the alternate outcome display. Alternatively, the control panel 66 may be provided with one or more buttons allowing the player to view or obscure the alternate outcome display, and the display generated at block 406 may prompt the player to press the button to view or obscure the alternate outcome display.

Upon selection of an option to observe or obscure the alternate outcome display, as determined at block 408, the variable cover 202 may be disposed over the inner rotatable reel 204 accordingly. If the player made a request for the alternate outcome display to be obscured, such request having been made by an appropriate input via the display unit 68, the display unit 70 or the control panel 66, the controller 100 (or controller 140) may receive the request and dispose a cover to visibly obscure the alternate outcome display at block 410. For example, the controller 100 (or controller 140) may cause each stepper motor 214 in the display unit 70 to rotate and stop the outer rotatable reel 202 at a position whereby the opaque cover portion 302 is disposed in front of the inner rotatable reel 204, thereby obscuring the player's view of the inner rotatable reel 204 and the symbols thereon. In addition, the controller 100 (or the controller 140) may prevent or stop the inner rotatable reel 204 from spinning, though it should be understood that the inner rotatable reel 204 may continue spinning even if obscured. When the controller 100 (or controller 120) determines an outcome of the multi-player Bingo game routine and an alternate outcome display corresponding to the outcome for the occurrence of the multi-player Bingo game, the alternate outcome display is visibly obscured by the outer rotatable reel 202 in accordance with the player's request.

On the other hand, if the player initiates a request to observe the alternate outcome display, the controller 100 (or controller 140) may dispose the cover to visibly display the alternate outcome display to the player at block 412. For example, the controller 100 may cause each stepper motor 214 in the display unit 70 to rotate and stop the outer rotatable reel 202 at a position whereby the transparent cover portion 304 is disposed in front of the alternate outcome display, thereby visibly displaying the inner rotatable reel 204 and the symbols thereon. When the controller 100 (or controller 120) determines an outcome for the multi-player Bingo game routine and an alternate outcome display corresponding to the outcome of the occurrence of the multi-player Bingo game, the alternate outcome display is visibly displayed through the outer rotatable reel 202 in accordance with the player's request.

If the player does not initiate a display request within a given time period, the routine 400 may initiate a default position for the variable cover. The default position may be the last position of the variable cover, or the default position may dispose the cover to either visibly obscure the alternate outcome display or visibly display the alternate outcome display. Once the alternate outcome display has been obscured or made visible based on the player's request, or lack thereof, the routine 400 may pass control to one of the multi-player Bingo game routines described further below.

Figure 6B:
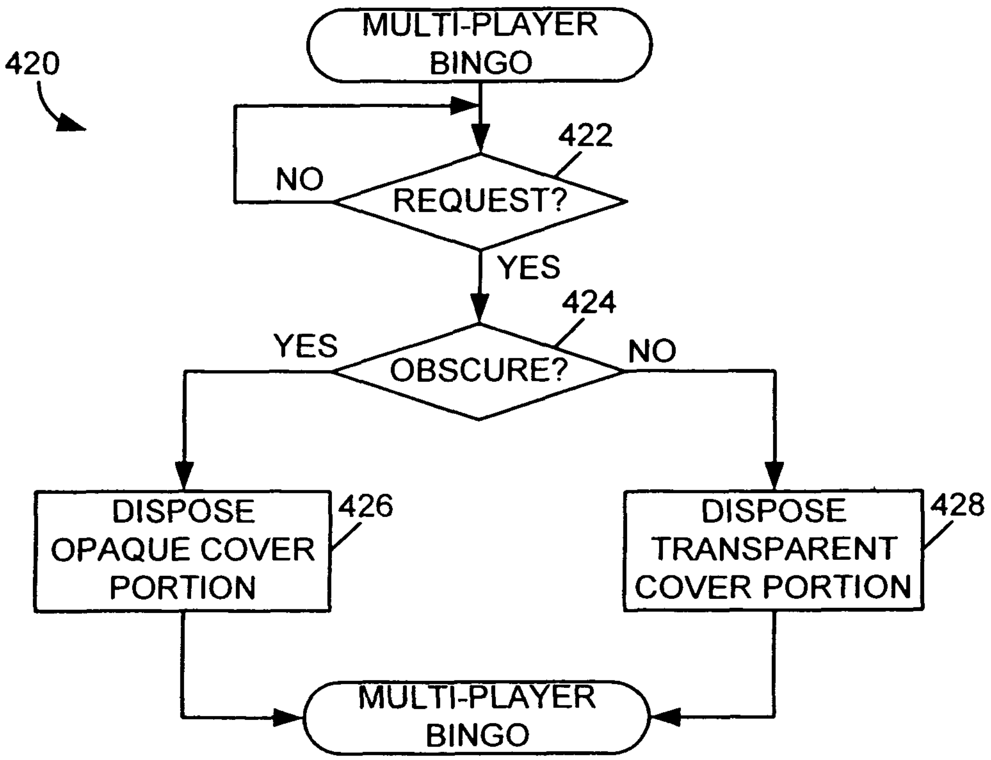
FIG. 6B is a flowchart of another embodiment of an alternate outcome display routine that may be performed by the gaming unit.

FIG. 6B is a flowchart of another embodiment of an alternate display routine 420 which may be stored in the memory of a gaming unit 20 to allow a player to view or obscure the alternate display outcome of the lower display unit 70. As with the alternate display routine 400 above, the routine 420 may be performed by the controller 100, or, in the case of multiple controllers, may be performed by the second controller 140. The routine 420 may be performed during any portion of the multi-player Bingo game routines described further below. For example, the routine 420 may be performed after the player enrolls in a multi-player Bingo game, but before the first ball is drawn. The routine 420 may also be performed following any occurrence of the multi-player Bingo game, but before a subsequent occurrence of the multi-player Bingo game (or the first ball draw thereof). The player may thereby be given multiple opportunities throughout the multi-player Bingo game routine to view or obscure the alternate outcome display. In one example, the multi-player Bingo game routine may be performed by the first controller 120 and the alternate display routine 420 may be performed by the second controller 140 thereby allowing the multi-player Bingo game to continue uninterrupted.

Referring to FIG. 6B, the routine 420 may begin operation at block 422 where the routine 420 may wait for an input from a player relating to a display request. If a player makes an input to the gaming unit 20 to obscure or observe the alternative outcome display, control may pass to block 242. If no request is received, the routine 420 may continue to wait. The input may be provided in a variety of forms, including, but not limited to, pressing one or more buttons provided on the control panel 66, on the video display 68 (if provided with a touch screen) or on the display unit 70 (if provided with a touch screen). The buttons may include a single button to toggle between obscuring and observing the alternate outcome display, or a button to obscure the alternate outcome display and another button to observe the alternate outcome display.

Upon receiving a request, the routine 420 may determine whether the request relates to a request to obscure the alternate outcome display or to observe the alternate outcome display. If the request is to obscure the alternate outcome display, as determined at block 424, the variable cover may be disposed to visibly obscure the inner rotatable reel 204 at block 426 by rotating and stopping the outer rotatable reel 202 such that the opaque cover portion 302 obscures the player's view of the inner rotatable reel 204 and the symbols thereon. The inner rotatable reel 204 may be prevented from or cease spinning. Alternatively, the inner rotatable reel 204 may continue spinning even if obscured. If the request is to observe the alternate outcome display, the variable cover may be disposed to visibly display the alternate outcome display at block 428 by rotating and stopping the outer rotatable reel 202 such that the transparent cover portion 304 is disposed in front of the alternate outcome display, thereby visibly displaying the inner rotatable reel 204 and the symbols thereon. Control may then pass back to the multi-player Bingo game routine. As above, if the player does not initiate a display request within a given time period, the routine 420 may initiate a default position for the variable cover.

Although the routines 400, 420 have been described as being performed by the controller 100, in the case of multiple controllers 120, 140, different aspects of the routines 400, 420 may be performed by different controllers 120, 140. For example, with the routine 400, the first controller 120 may perform the attraction sequence at block 402, detect a player at block 404, generate the game request display at block 406. On the other hand, the second controller 140 may detect a request at block 408 and dispose the variable cover based on the display request at blocks 410, 412. Alternatively, the routine 420 may be performed entirely by the second controller 140 whereas the first controller 120 may perform the multi-player Bingo game routine.

Multi-Player Bingo

Figure 7A:
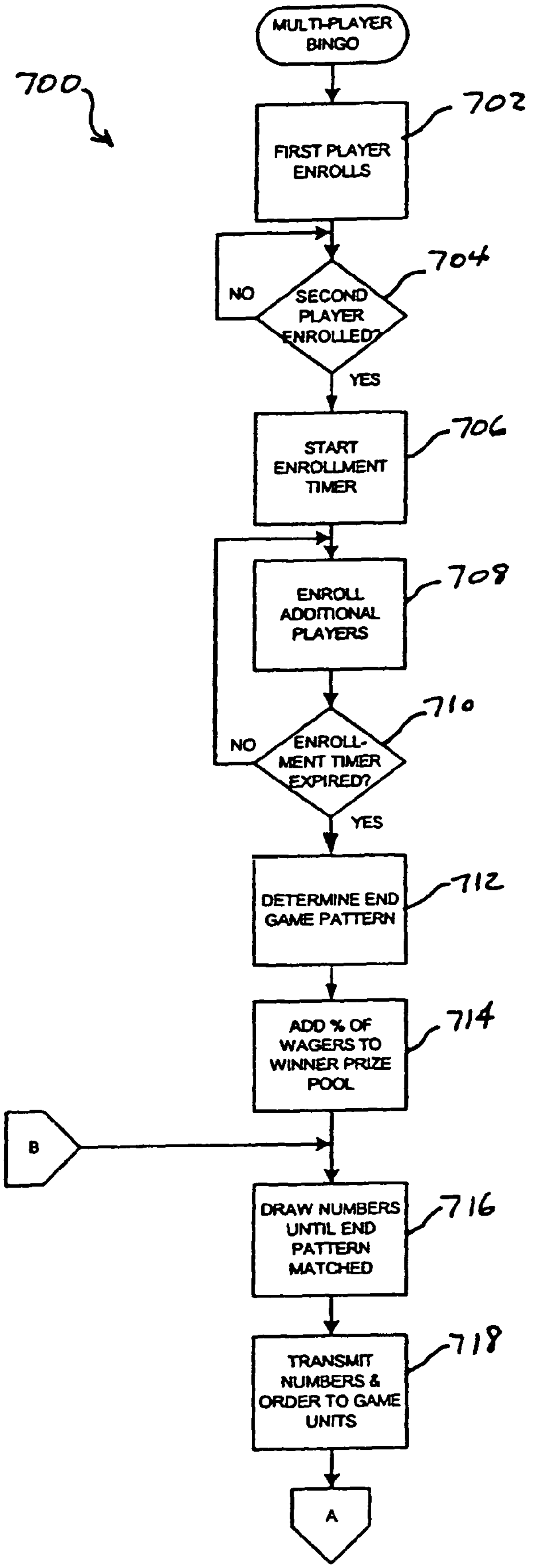
FIGS. 7A and 7B are a flowchart of a embodiment of a multi-player Bingo game routine that may be performed by the gaming network.
Figure 7B:
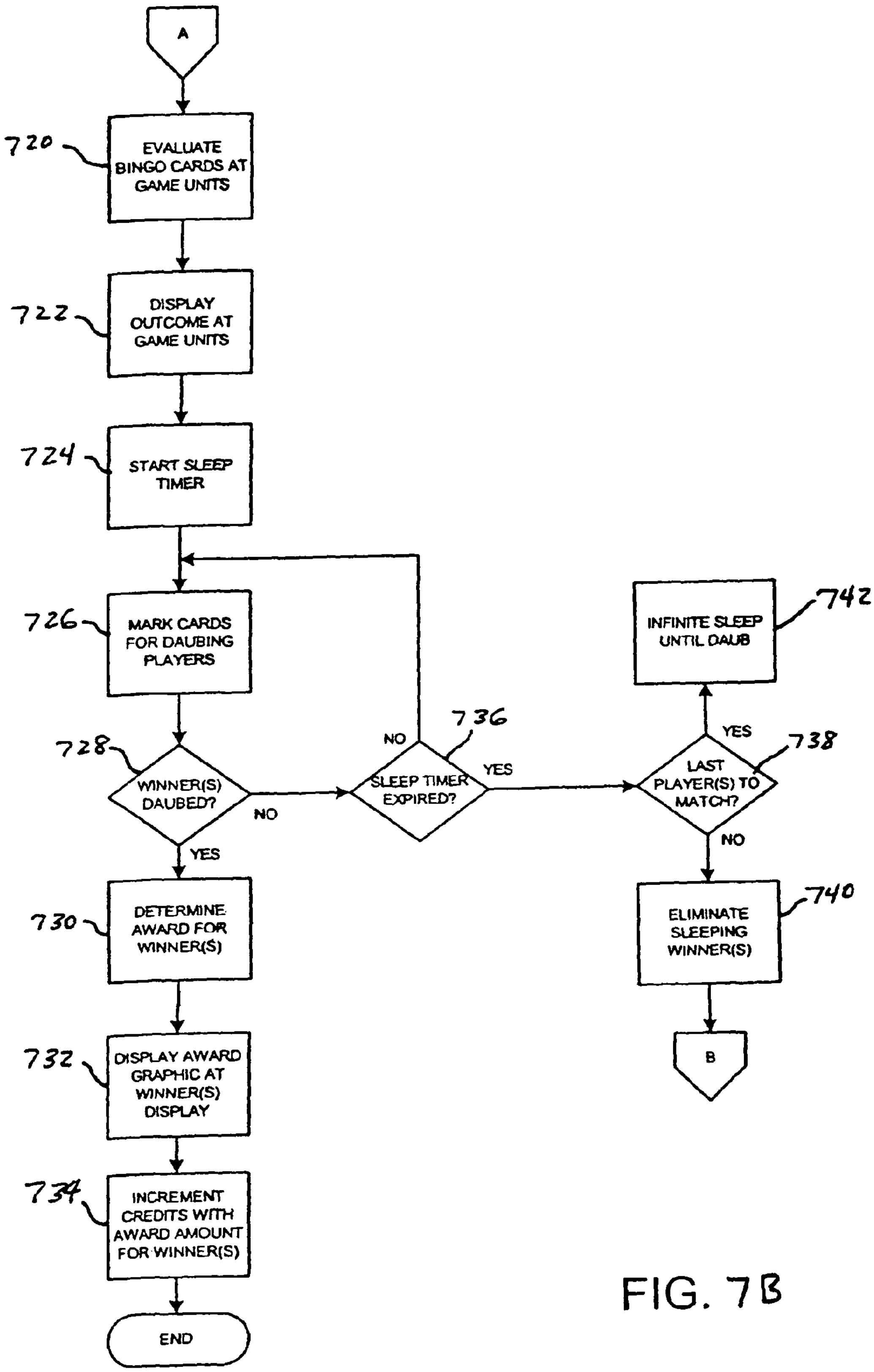

FIGS. 7A and 7B are a flowchart of an example of a multi-player Bingo game operating routine 700 that may have portions stored in the memories of a plurality of gaming units 20 and the network computer 22 to allow a plurality of players to play a Bingo game against each other. Further examples of multi-player Bingo game operating routines and associated displays are disclosed in U.S. application Ser. No. 10/887,111 entitled "Multi-Player Bingo Game with Multi-Level Award Amount Pattern Mapping" which is expressly incorporated by reference herein. However, it should be understood that additional types of games are contemplated which may utilized an alternate outcome display, including additional multi-player games, single-player games and different types of Bingo games.

Referring to FIG. 7A, the multi-player Bingo routine 700 may begin operation at block 702 at which a first player enrolls in the multi-player Bingo game at one of the gaming units 20. In order to enroll in the multi-player Bingo game, a player may initially deposit value in the gaming unit 20 via the coin slot 52, currency acceptor 54, ticket reader 56, card reader 58, or by any other means by which a player may obtain credits on the gaming unit 20. Once value is deposited and credits are registered on the gaming unit 20, a player may make game-specific selections for the occurrence of the Bingo game via one or more selection buttons at input control panel 66, or by touching designated portions of the video display units 68, 70.

Figure 8:
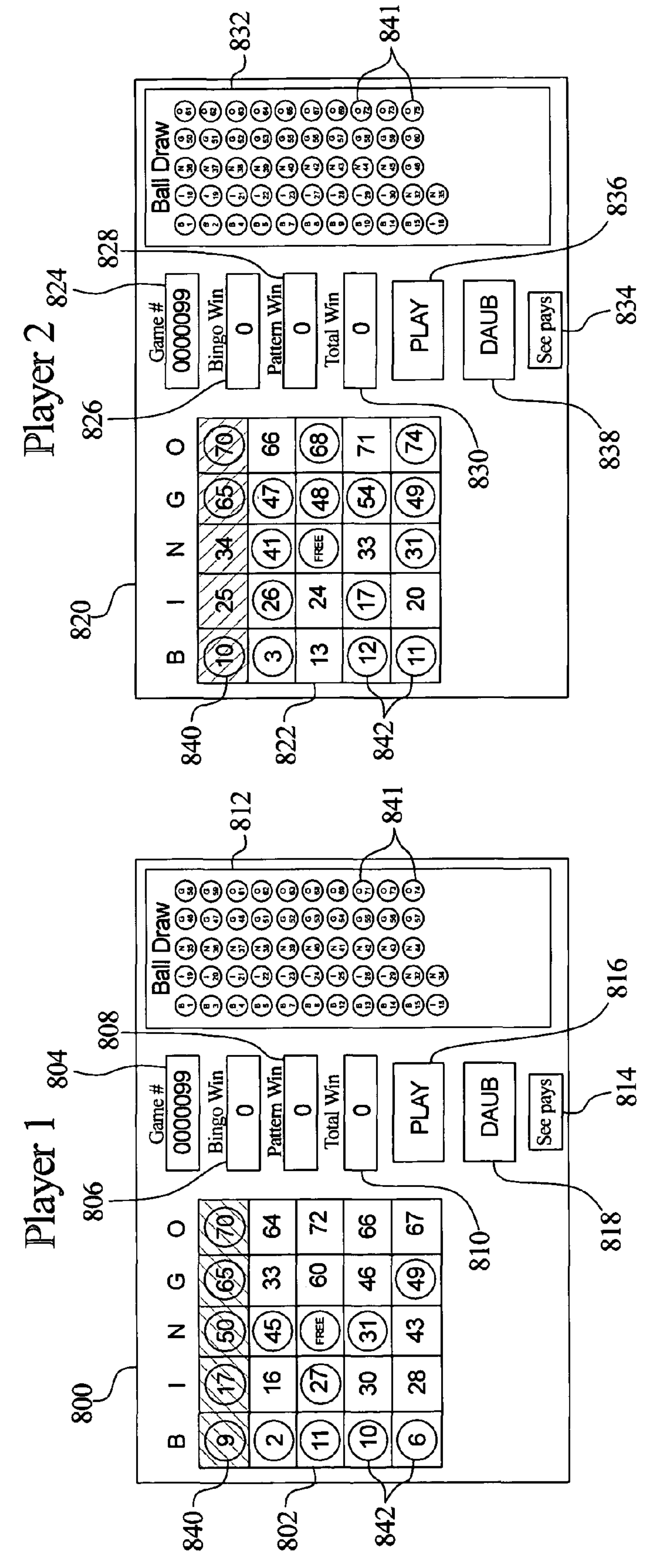

FIG. 8 illustrates an exemplary first player display 800 that may be shown on, for example, the display unit 68 during the performance of the multi-player Bingo routine 700 at a first gaming unit 20, and an exemplary second player display 820 that may be shown, for example, on the display unit 68 during the performance of the multi-player Bingo routine 700 at a second gaming unit 20. The first player display 800 may include video images 802 of a Bingo card that may represent the first player's entry in the multi-player Bingo game. In the illustrated embodiment, the Bingo card image 802 may be in the form of a traditional Bingo card as is known in the art and may consist of a 5×5 matrix of numbers, with the first column having five numbers selected from the range of 1 to 15 without repeating numbers, the second column having five numbers selected from the range of 16 to 30 without repeating numbers, the third column having four numbers selected from the range of 31 to 45 without repeating numbers and having a "Free Space" spot disposed in the middle position, the fourth column having five numbers selected from the range of 46 to 60 without repeating numbers, and the fifth column having five numbers selected from the range of 61 to 75 without repeating numbers.

The first player display 800 may include video images 804-810 corresponding to information relating to the game being executed by the network computer 22 and gaming unit 20. These images may include a game number image 804 for the Bingo game being played by the player at the gaming unit 20, a Bingo win amount image 806 displaying the amount awarded to the first player or players matching the game-winning pattern on the Bingo card 802, a pattern win amount image 808 displaying the amount awarded for matching predefined interim win patterns which will be discussed further hereinafter, and a total win amount image 810 displaying the total amount awarded to the player for the Bingo game indicated at game number 804, and an area 812 that may be used to display the numbers in the ball draw for the Bingo game in a manner illustrated more fully below. In addition, the first player display 800 may include images of buttons that, when touched by the player, may cause additional game-related information to be displayed, or may control execution of the multi-player Bingo routine 700.

For example, the first player display 800 may include a "See Pays" button 814 that, when activated, may cause the display unit 68 to generate one or more display screens showing the pattern or patterns to be matched, odds of matching the various patterns or winning the available awards, or other payout information for the Bingo game and the interim pattern wins. The first player display 800 may also display a "Play" button 816 that when touched may cause the gaming unit 20 to enroll the player in the next occurrence of the Bingo game, and a "Daub" button 818 that the player may touch to mark matched numbers on the Bingo card after the ball draw. The term "daub" in Bingo refers to marking or covering by the player, or possibly by an electronic Bingo handset, of the numbers or symbols on the Bingo card(s). With respect to the multi-player Bingo game, "daubing" refers to the player acting to mark or cover the numbers either individually or by initiating a process wherein the gaming unit 20 marks or covers the matched numbers on the Bingo card 802. While not shown, those skilled in the art will understand that a plurality of player-selectable buttons may also be displayed on the first player display 800 of the control panel 66 to allow the player to control the play of the Bingo game. The second player display 820 may be similar to the first player display 800 and display similar images, such as Bingo card 822, game number image 824, Bingo win amount image 826, pattern win amount image 828, total win amount image 830, ball draw area 832, "See Pays" button 834, "Play" button 836, "Daub" button 838, and other control buttons if necessary.

While the Bingo game illustrated herein uses a traditional 5×5 matrix of numbers with a free space in the center, those skilled in the art will understand that the Bingo game may be configured to use other configurations of numbers, characters or other game indicia arranged in any fashion wherein numbers, characters, or other indicia may be drawn and compared to the configuration, with the first player or players matching a predetermined pattern of numbers, characters or other indicia being declared the winner. For purposes of this specification, such configurations of numbers, characters or other game indicia may be referred to as "arrays," and an array may be any configuration or grouping of numbers, characters or other game indicia wherein the game indicia of the array may be compared to game indicia drawn from the range of game indicia available for the multi-player game, and wherein matched indicia of the array may be compared to a predetermined pattern or patterns in order to determine a winner or winners of an occurrence of the multi-player wagering and/or to award game-winning or other awards to the players. Such arrays may be configured as two-dimensional matrices such as, for example, traditional Bingo cards as described above, or in any other arrangement of game indicia wherein matched game indicia of the array may form patterns.

When the first player enrolls in the Bingo game, the Bingo card 802 may be selected at random by the controller 100, or the controller 120, of the gaming unit 20. The player may be required to play the controller-generated Bingo card 802 or, alternatively, the player may be permitted to view other Bingo cards 802 and to select a Bingo card 802 for use in the Bingo game. For example, once the controller-selected Bingo card 802 is displayed to the player at video display 68, the player may be able to cycle through other Bingo cards 802 by touching the area of the video display 68 where the Bingo card 802 is displayed, or by touching other appropriate buttons either displayed on the video display 68 or located at the control panel 66. In addition to being assigned and/or selecting a Bingo card 802, the player may also enter a wager amount for the Bingo game by pressing the appropriate selection buttons on the first player display 800 or control panel 66. Selection of the wager amount is discussed further herein below. Once the Bingo card is selected for the first player, and the player enters a wager for the Bingo game, the player may enroll in a Bingo game by pressing the "Play" button 816; When the controller 100 (or controller 120) detects that the first player has touched the "Play" button 816, the controller 100 (or controller 120) may transmit a message to the network computer 22 indicating that the first player has enrolled in the Bingo game. In the illustrated embodiment, the gaming unit 20 may also transmit information to the network computer 22 regarding the content of the first player's Bingo card for use by the network computer 22 in a manner discussed more fully below.

Because each Bingo game is played by multiple players, the network computer 22 may be required to wait for the enrollment of additional players before drawing numbers for the occurrence of the Bingo game. Referring back to FIG. 7A, the network computer 22 may determine whether a second player has enrolled in the Bingo game and another gaming unit 20 at block 704. If the network computer 22 has not received a message from another gaming unit 20 indicating that a second player has enrolled in the Bingo game, the network computer 22 will continue to wait until receiving such a message. At the same time, the first gaming unit 20 may display a message on the first player display 800 informing the first player that the system is waiting for additional players to join the Bingo game before beginning the ball draw.

At some point, a second player at a second gaming unit 20 may select a Bingo card and desired wagering amount, and touch the play button 836 of the second player display 820 to enroll in the Bingo game. The second gaming unit 20 may detect the touching of the play button 836 by the second player and transmit the necessary enrollment message to the network computer 22 to enroll the second player. When the network computer 22 detects the enrollment message from the second gaming unit 20, control may pass to a block 706 wherein the network computer 22 may start an enrollment timer for a predetermined period of time within which additional players may enroll in the Bingo game. The enrollment period may be a fixed amount of time for all occurrences of the Bingo game, or may be capable of being changed to a desired time period by a casino employee at the network computer 22. Further, the network computer 22 may be programmed to adjust the time period dynamically as the Bingo game is being played in order to maintain a desired average number of players. For example, the network computer 22 may reduce the time period during heavy play periods to prevent too many players from enrolling, and increase the time period during light play periods to give more players the opportunity to enroll in an occurrence of the Bingo game.

During the enrollment time period, the network computer 22 and other gaming units 20 may enroll additional players in the Bingo game at block 708. The enrollment process for the additional players may be similar to the process for the first two players, with each additional player selecting a Bingo card, selecting a wager amount, and touching the play button of the gaming unit 20 and thereby causing an enrollment message to be transmitted from the gaming unit 20 to the network computer 22. If the gaming units 20 include alternate outcome displays for displaying the outcome of the Bingo game in an alternative format, such as a slots display as discussed below, animated graphics or other display, such as the spinning of electromechanical reels, may be initiated at the gaming units 20 once the second player enrolls in the Bingo game. At block 710, the network computer 22 evaluates the enrollment timer to determine whether the time for additional players to enroll in the Bingo game has expired. If the enrollment timer has not expired, the network computer 22 continues to wait for additional players to enroll in the Bingo game. Once the enrollment timer expires, the network computer 22 proceeds with conducting the Bingo game for the players that have enrolled in that occurrence of the Bingo game. Any players enrolling after the expiration of the enrollment timer may be enrolled in the subsequent occurrence of the Bingo game in the same manner. Consequently, the network computer 22 may conduct multiple occurrences of the Bingo game simultaneously.

A game-winning pattern or patterns may be predetermined and used for each occurrence of the Bingo game. Alternatively, at block 712 the network computer 22 may determine a game-winning pattern to be used for the occurrence of the Bingo game. The network computer 22 may store a plurality of predetermined game-winning patterns and randomly or serially select one or more of the stored game-winning patterns for each occurrence of the Bingo game. The predetermined game-winning patterns may include game-winning patterns used in traditional Bingo games, such as rows, columns or diagonals of numbers on the Bingo card 802, four corners matches, picture frames, coveralls, and the like. The predetermined patterns may also include nontraditional game-winning patterns such as patterns forming letters, numbers, or other symbols, or any other desired pattern that may be formed by one or more of the numbers, characters, or other game indicia used to form the Bingo card 802 for a player. Alternatively, the game-winning pattern for a given occurrence of the Bingo game may be determined at least in part on the number of players entered for the occurrence of the Bingo game in order to approach a desired distribution of the number of balls drawn for the first player to match the game-winning pattern in a manner described more fully below. Whether based on the number of players or Bingo cards enrolled for the occurrence of the Bingo game or other criteria, the game-winning patterns may be generated randomly but consistent with pre-designated parameters, such as number of spots in the game-winning pattern, number of shared spots between two or more game-winning patterns, and the like. Once the game-winning pattern is determined, the network computer 22 may transmit the game-winning pattern to the gaming units 20 which in turn may display the game-winning pattern to the players on the Bingo displays 800, 820, such as with a shaded area 840 on the Bingo cards 802, 822 corresponding to the game-winning pattern.

In some implementations of the multi-player Bingo game, the first player or players matching the game-winning pattern may be awarded a fixed prize amount, or a prize amount proportionate to the amount wagered by the player or players on the occurrence of the Bingo game. In this embodiment, a portion of each player's wager on each occurrence of the Bingo game may be accumulated in a prize pool from which players may be awarded an additional prize amount for matching the game-winning pattern or other pattern in fewer than a predetermined number of balls are drawn for the occurrence of the Bingo game. For example, a player may be awarded an additional prize from the prize pool for matching a five number pattern when ten or fewer balls have been drawn, or by covering the entire Bingo card when fewer than 30 balls have been drawn. The amount of the additional prize from the prize pool may be determined in a manner described more fully below. In this embodiment, control may pass to a block 714, wherein a percentage or other predetermined portion or each player's wager on the occurrence of the Bingo game may be added to a prize pool. The portion of each players wager for the prize pool may be determined at each gaming unit 20 and transmitted to the network computer 22 or other device in the gaming network 10 where at the prize pool is accumulated and stored. Alternatively, the network computer 22 may deduct the portion for the prize pool from each of the players' wagers after the players enroll in the Bingo game. While block 714 is illustrated as occurring prior to the ball draw, the additions to the prize pool may occur at any appropriate or desired time during the Bingo game.

In this embodiment, control of the Bingo game routine 700 may pass to a block 716 wherein the network computer 22 draws numbers from the range of 1 to 75 until one or more Bingo card matches the game-winning pattern. The network computer 22 may be configured to randomly select numbers from the range of 1 to 75 without repeating numbers, and to compare the drawn number to the numbers on each players Bingo card to find matching numbers. As each number is selected and compared to the player's game cards, the network computer 22 may also compare the patterns formed by the matching numbers on each game card to the game-winning pattern for the occurrence of the Bingo game. Once the network computer 22 determines that one game card has a pattern of matched numbers matching the game-winning pattern, the network computer 22 may cease selecting numbers for the ball draw and transmit the numbers for the ball draw to the gaming units 20 corresponding to each player entered in the occurrence of the Bingo game at block 718.

The gaming units 20 receive the numbers for the ball draw from the network computer 22, and compare the drawn numbers to the corresponding players' Bingo cards at block 720 of FIG. 7B in a similar manner as the network computer 22 to identify matches between the numbers in the ball draw and the numbers on the players Bingo card. After comparing the numbers from the ball draw to the numbers on the player's card, the gaming unit 20 may further determine whether patterns formed on the player's Bingo card matches the game-winning pattern for the occurrence of the Bingo game. At block 722, each gaming unit 20 may display the outcome of the ball draw for the Bingo game at the display unit 68. The numbers on the players' Bingo cards 802, 822 matching numbers selected by the network computer 22 in the ball draw may be highlighted on the Bingo cards 802, 822, such as by displaying phantom parks 842 to assist the players in identifying which number on the Bingo cards 802, 822 have been matched.

Figure 9:
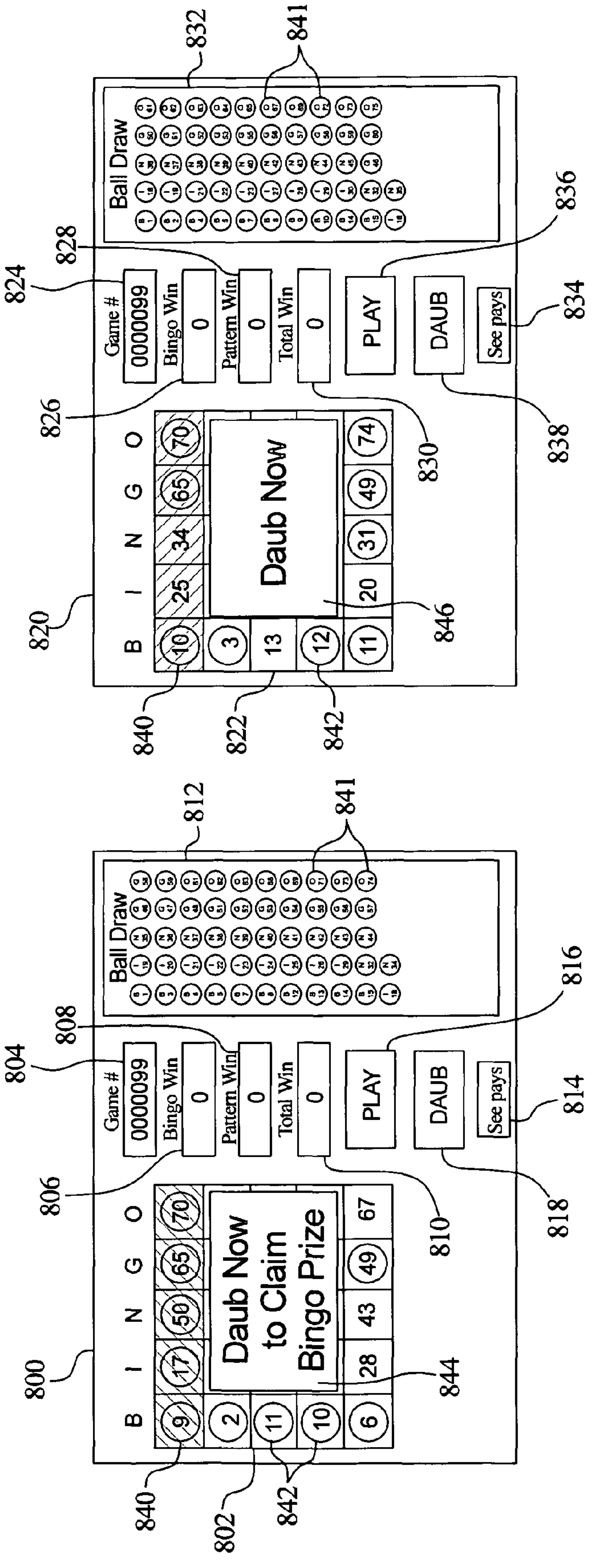

The multi-player Bingo game may be implemented such that once at least one player matches the game-winning pattern, the game is over and the player or players matching the game-winning pattern receive the corresponding Bingo win award. If the gaming units 20 include alternate outcome displays for displaying the outcome of the Bingo game in an alternative format, the alternate outcome display may also show the player's outcome for the Bingo game, such as by stopping the reels of slots display in positions corresponding to the outcome of the Bingo game. However, the multi-player Bingo game may be implemented such that the players may be required to perform a physical act to cause the matching numbers to be marked on the players' Bingo cards. In fact, such a physical act may be a regulatory requirement in the jurisdiction in which the multi-player Bingo game is implemented. In the embodiment of the Bingo game routine 700 illustrated in FIGS. 7A and 7B, players may be required to daub in order to have the matching numbers marked on their Bingo cards, and the winning players may be required to daub their Bingo cards in order to claim the award for the occurrence of the Bingo game. In this embodiment, at block 722, each gaming unit 20 may be configured to display prompts to the players, such as prompts 844, 846 on the Bingo displays 800, 820, respectively, of FIG. 9, instructing the players to daub in order to complete the Bingo game. Additional prompts may be displayed on the lower display unit 70, as described below. The same prompt may be displayed for all players, or different prompts may be displayed to players who may have a winning Bingo card. For example, as illustrated in FIG. 9, the first player with Bingo card 802 may be one of the first players to match the game-winning pattern. In this case, the prompt 844 displayed to the first player may instruct the player to daub the Bingo card to claim the Bingo game prize. The Bingo game prize may be claimed by the winning player by touching the "Daub" button 818 to acknowledge the prompt. The remaining players, such as the second player, that have not matched the game-winning pattern may be shown a prompt 846 that may merely instruct the players to daub in order to complete the Bingo game, which may be accomplished by touching the "Daub" button 838.

Once the initial ball draw is transmitted from the network computer 22 to the gaming units 20, and the ball draw and phantom marks 842, if any, are displayed to the players at their respective gaming units 20, control may pass to a block 724 wherein a sleep timer may be initiated with a predetermined amount of time within which the winning player or players must daub their Bingo cards in order to claim the Bingo game award. A sleep timer may be set at each gaming unit 20 at which the player matches the game-winning pattern, or a single timer may be set at the network computer 22. During the sleep timer period, the gaming units 20 may mark the matching numbers on the players Bingo cards as the players touch the corresponding "Daub" buttons 818, 838. The phantom marks 842 on the Bingo cards 802, 822 may be changed into daub marks 848 by the gaming units 20 as the gaming units 20 detect the players touching the "Daub" buttons 818, 838. Also during the sleep timer period, the network computer 22 and/or gaming units 20 may evaluate whether one or more players matching the game-winning pattern has daubed the players Bingo card at block 728. If the winner or winners of the occurrence of the Bingo game have daubed their Bingo cards, control passes to a block 730 wherein the Bingo win award may be determined for the winning player or players at either the corresponding gaming units 20, or at the network computer 22. As previously discussed, the Bingo win award may be a fixed award amount, an amount proportionate to the players wager, a portion or all of an accumulated prize pool, or a combination of various award amounts.

After the Bingo game award or awards are determined, control may pass to block 732 wherein an award image, such as the award image 850 illustrated in FIG. 10, may be displayed to the winning players at the corresponding gaming units 20. The award image 850 may include a summary of the award amount, a congratulatory message to the winning player or players, and other images that may enhance the winning experience of the player or players. The award image 850 may be displayed for a predetermined amount of time or until the player touches the display unit 68 to acknowledge the display of the game award. At this time, an alternate outcome display at the gaming unit 20 may also show the player's outcome for the Bingo game, if so requested by the player, such as by stopping the reels of slots display in positions corresponding to the outcome of the Bingo game. After the award graphic is displayed, control may pass to a block 734 wherein the credits at the gaming units 20 for the winning players are incremented by the award amount.

In certain jurisdictions, regulatory requirements may exist for performing at least two releases of numbers, along with corresponding daubing of the Bingo cards by the players, prior to declaring a winner for the occurrence of the Bingo game. In gaming networks 10 implemented in such jurisdictions, it may be necessary to modify the Bingo game routine 700 such that at least two subsets of randomly selected numbers are transmitted from the network computer 22 to the gaming units 20 in an occurrence of the Bingo game. In such implementations, once the network computer 22 determines that at least one game card matches a game-winning pattern with the drawn numbers at block 716, the network computer 22 may transmit a first subset of the selected numbers to the gaming units 20 including at least one number less than the numbers required for one of the game cards to match the game-winning pattern. For example, if the network computer 22 determines that a game card matches the game-winning pattern on the forty-second selected number, the network computer 22 may transmit the first forty-one or fewer selected numbers to the gaming units 20 in the first subset. Once the gaming units 20 receive the first subset of numbers, the routine 700 may proceed in the same manner, with the gaming units 20 evaluating the game cards, displaying the outcomes and waiting for the players to daub their game cards. After the expiration of the sleep timer, control may return to block 718 wherein the network computer 22 may transmit a second subset of the selected numbers with the remaining numbers required for one of the game cards to match the game-winning pattern, and the routine 700 may proceed in the manner illustrated in FIGS. 7A and 7B and further described herein.

If the network computer 22 and game units 20 do not detect that the winner or winners of the Bingo game have daubed their Bingo cards at block 728, control passes to a block 736 that determines whether the sleep timer has expired. If the sleep timer has not expired, control passes back to block 726 wherein the gaming units 20 continue to mark the Bingo cards of the corresponding players as the players touch the "Daub" button 818, 838. If the sleep timer expires without any winner or winners of the Bingo game daubing their Bingo cards, control passes to a block 738 wherein the network computer 22 may determine whether all the players have slept through their opportunity to win the Bingo game. If players remain that have not slept through their opportunity to win the Bingo game, i.e., players whose Bingo cards have not yet matched the game-winning pattern, control passes to a block 740 wherein the winner or winners who have failed to daub their Bingo cards are eliminated from being able to claim the prize for the Bingo game. For example, after the potential winner sleeps through the player's opportunity to win the Bingo game, the network computer 22 may flag or otherwise indicate that the player has slept through the player's opportunity to win the occurrence of the Bingo game. Additionally, the players sleeping through the period for daubing the players' winning Bingo cards may be notified that the right to claim an award for the Bingo game has been relinquished by displaying an image on the video display 68 of the corresponding gaming unit 20. However, where multiple game-winning patterns are used in the Bingo game, a player sleeping through a match of one of the game-winning pattern may be eliminated from claiming that Bingo win, but may be permitted to win the Bingo game if the player matches another game-winning pattern later in the ball draw and successfully daubs their Bingo card.

After eliminating the sleeping player or players, control may return to block 716 wherein the network computer 22 may draw additional numbers until at least one Bingo card of the remaining players matches the game-winning pattern. The Bingo game routine 700 continues in the manner previously described, with the game computer 22 transmitting the numbers to game units 20 at block 718, and the game units evaluating the players Bingo cards at block 720. At block 722, the display of the outcome of the Bingo game displayed at the video display 68 at the game units 20 may be updated to reflect the continuation of the ball draw. The sleep timer may be reinitiated at block 724, and the gaming units 20 may mark the players Bingo cards as the players touch the "Daub" button 818, 838 at block 726 until either all the winners daub (block 728) or the sleep timer expires (block 736). If the remaining player or players matching the game-winning pattern have daubed their Bingo cards, Bingo win awards are determined at block 730 and the award image 850 may be displayed at the video display 68 of the gaming units 20 corresponding to the winning players at block 732 and the Bingo award amounts may be credited to the winning players at block 734.

Returning to block 738, if the network computer 22 determines that the last remaining player has slept through daubing the players Bingo card, several alternatives are possible for terminating the Bingo game. In the illustrated embodiment, control passes to a block 742 wherein the gaming units 20 involved in the occurrence of the Bingo game may sleep infinitely until one of the gaming units 20 detects a player daubing their Bingo card by touching the "Daub" button 838. During this time, casino personnel may be alerted to the suspended Bingo game by displaying messages at the gaming units 20, network computer 22, or any other component of the Bingo gaming system 10 used to monitor the activity occurring in the Bingo gaming system 10, by illuminating the candles 92 mounted on the gaming units 20, or by any other mechanism available within the system for alerting casino personnel to abnormal conditions within the Bingo gaming system 10. Alternatively, the occurrence of the Bingo game may be terminated after a predetermined period of time, with the wagers on the terminated game being retained by the Bingo gaming system 10. During the time that the last remaining player sleeps, players that earlier slept through their Bingo wins may be permitted to daub their Bingo cards, collect interim pattern awards if any, and continue playing subsequent Bingo games without waiting for the last remaining player to claim the Bingo win.

While the general flow for the multi-player Bingo game routine is discussed herein, the game play for the multi-player Bingo game may be modified as necessary based on system design and/or regulatory requirements, design preferences and the like. For example, where two or more players may remain in an occurrence of the Bingo game, and wherein each of the remaining players may require the same number of balls to match the game-winning pattern, the Bingo win award may be awarded to the remaining players based whether some or all of the players daub their Bingo cards. If all remaining players daub their Bingo cards, the Bingo win award may be split between the remaining players. If less than all of the remaining players daub their Bingo cards before the expiration of the sleep timer, the routine may be configured either to split the Bingo win award between the remaining players that have daubed their Bingo cards, or to split the Bingo win award between all the remaining players if any of the remaining players daub their Bingo cards before the expiration of the sleep timer. Similarly, if all the remaining players sleep through their Bingos, the Bingo game may sleep infinitely until one of the remaining players daubs their Bingo card. Once one of the remaining players daubs their Bingo card, the routine may be configured either to pay the entire Bingo win award to the remaining player to first daub their Bingo card, or to split the Bingo win award between all the remaining players if any of the remaining players daub their Bingo cards before the expiration of the sleep timer.

The routine may also be modified in implementations where a player may not be required to daub their Bingo cards to receive the Bingo win award. In these implementations, the portions of the routine relating to the sleep timer and daubing, and to eliminating sleeping players and declaring additional winners may be omitted. Even in implementations where players may sleep through a Bingo win, the consequences of sleeping through the Bingo win may be varied as desired. For example, as illustrated, the player who sleeps through a Bingo win may be shut out of collecting the Bingo win even if the player daubs the Bingo card after the sleep timer expires and the player is eliminated. Alternatively, the player initially sleeping through a Bingo win may be provided with the opportunity to claim the Bingo win award if the player daubs the Bingo card before a subsequently declared winning player daubs their Bingo card.

Interim Pattern Bingo Awards

In order to enhance the players' gaming experience while playing the multi-player Bingo game, the Bingo game may be configured with alternative methods for providing additional award payouts to the players, including players that are not the first to match the game-winning pattern. In one embodiment, players may be awarded prizes for matching predefined interim patterns on their Bingo cards having associated award amounts during the course of the Bingo game. The patterns may be termed "interim" because the patterns may be matched during the course of the game, and the patterns do not result in the termination of the game when they are matched. The Bingo game terminates only when one or more players match the game-winning pattern. When a player matches an interim win pattern, the player may be awarded the prize amount corresponding to the matched interim pattern regardless of whether the player matches the game-winning pattern.

The interim pattern sets may vary in terms of the number of interim patterns in the sets, the configuration of the interim patterns in the sets, the complexity of the interim patterns in the sets, the interim pattern award amounts available for matching interim patterns in the sets, and the like. The gaming units 20 may be configured to randomly or sequentially select one of a plurality of available interim pattern sets for use in a given occurrence of the Bingo game. Alternatively, the players may be provided with the ability to select one of the available interim pattern sets based on their own preferences. For example, several interim pattern sets having approximately the same overall interim pattern award payout rates may be provided, but with the interim pattern sets paying out interim pattern awards with varying frequencies. Some interim pattern sets may result in paying out relatively small interim pattern awards relatively frequently, some interim pattern sets may result in paying out relatively large interim pattern awards relatively infrequently, and some interim pattern sets may result in paying out a combination of large and small interim pattern awards. The gaming units 20 may display the interim pattern sets and allow the players to select interim pattern sets corresponding to their preferences in their gaming experience.

Alternatively, the interim pattern sets used for an occurrence of the Bingo game may be determined based on the amount wagered by the players. In slots, the number of winning combinations and the maximum amount that may be won by the player is dependent on number of paylines played and the amount wagered per payline. The maximum prizes may only be available for where the player wagers the maximum amount on the maximum number of available paylines. Similarly in the multi-player Bingo game, the players may be able select one of a plurality of available interim pattern sets and select a wager amount to be applied to each interim pattern within the interim pattern sets. Where nine interim pattern sets are available, the player may be able to play the first interim pattern set for one credit, play the second interim pattern set for two credits, and so on up to nine credits for the ninth interim pattern set. The first interim pattern set costing the player only a one credit wager may have the lowest probability of paying out an interim pattern award and have the lowest interim pattern award amounts available, while the ninth interim pattern set may have the highest probability of paying out an interim pattern award and have the highest interim pattern award amounts available. Additionally, the player may be able wager from one to five times the credits required for a given interim pattern set. Consequently, in this example the player may be able to wager between one and forty-five credits per game in order to vary the odds of receiving an interim pattern award and of winning a larger interim pattern award based on their preferences for their gaming experience.

Examples of interim patterns and interim pattern Bingo awards are further disclosed in U.S. application Ser. No. 10/887,111, referred to above and expressly incorporated by reference herein.

Multi-Level Award Amount Pattern Mapping

Where relatively few Bingo win and/or interim pattern award amounts may be offered to the players of the multi-player Bingo game, it may be relatively simple to select a set of patterns to achieve a desired probability of paying out each award amount and a desired overall Bingo award payout rate. Moreover, with relatively few Bingo patterns to evaluate, the players may be able to readily identify whether any of the Bingo patterns are matched on their Bingo cards. As the number of award amounts increases, it may become increasingly difficult to map the award amounts to Bingo patterns on a standard Bingo card. As the number of award amounts increases, the amount of interaction between the Bingo patterns, and the corresponding impact on probabilities of matching the Bingo patterns where only the highest award amount is paid out, may increase the difficulty of matching the probabilities of matching the Bingo patterns to the desired probabilities of paying out the award amounts. Moreover, the players may have more difficulty identifying Bingo pattern matches on their Bingo cards as the number of Bingo patterns increases.

The difficulty in matching Bingo patterns to a large number of award amounts may be reduced by applying a multi-level mapping strategy wherein most or all of the desired award amounts may be provided without the necessity assigning distinct Bingo patterns to each award amount. In one embodiment of a multi-level mapping strategy, the desired award amounts may be divided into a plurality of subsets or pay groups, with each subset or pay group containing one or more of the award amounts, and then assigning primary patterns to each of the pay groups and secondary patterns to each of the award amounts within the pay groups. The mapping strategy may be applied equally to award amounts for Bingo game winners and for interim pattern matches. The award amounts and associated probabilities may be determined in any known manner for calculating paytables to achieve a desired award payout rate. Moreover, as an alternative to determining the award amounts and probabilities from scratch, the awards and probabilities may be derived from known paytables used in other gaming devices to achieve a desired payout rate. The mapping strategy may likewise be used to match a known alternate game outcome to a Bingo game outcome. An example of a multi-level mapping routine is disclosed in U.S. application Ser. No. 10/887,111, referred to above and expressly incorporated by reference herein.

Alternative Displays of Bingo Game Outcomes

As previously discussed, players may find the display of other games, such as slot machines, video poker, video blackjack, video Keno and the like, to be more appealing than the display of Bingo games. Moreover, as the number of award amounts and, correspondingly the number of Bingo patterns, offered in a Bingo game increases, it may become more difficult for players to discern winning outcomes (i.e. pattern matches) in a Bingo game than, for example, a slot machine offering a comparable number of award amounts based on matching reel symbols along a plurality of paylines. The Bingo player's gaming experience may be enhanced by providing an alternate display of the outcome of the Bingo game determined based on a ball draw and the player's Bingo card in a format that may be preferential to the player or allow the player to more readily identify winning outcomes of the Bingo game. In one alternative, the outcome determined by the Bingo game may be presented to the players with the display simulating the appearance of a traditional Class III game, such as electromechanical or video slots, video poker, video blackjack, video Keno and the like. In another alternative, the player may be provided with the option of observing the simulated display.

It may be emphasized that the slot reels or other alternate outcome displays used to display the outcome determined by the Bingo game may not themselves determine the outcome of the Bingo game. The Bingo gaming system is conducting a Bingo game that may still be played without providing the supplemental outcome display offered by such alternate outcome displays. The ball draw leads to covered numbers, characters or other game indicia on the Bingo card. Achieving coverage of the predetermined game-winning pattern leads to a Bingo win award. The game-winning patterns and/or interim patterns may be chosen to achieve desired Bingo game dynamics. However, the targeted dynamics (i.e. the Bingo win award values, the relative frequency of occurrence of the awards, the Bingo win and interim pattern payout rates, and the like) may be selected so as to closely mirror the dynamics that a desired alternate outcome display, such as a particular slot machine or other casino game, might produce. The correspondence between the Bingo game dynamics and the casino game dynamics may allow the designer to map the Bingo game awards to the display of the casino game via the alternate outcome display, thereby providing an alternative and potentially more user-appealing display of the Bingo outcome.

In one embodiment, an existing casino game may be used for the alternate outcome display, with the award amounts and the paytable for the casino game being used to configure the Bingo game dynamics. For example, the multi-player Bingo game may include an alternate outcome display simulating the appearance of a traditional slot machine, with interim patterns being mapped to the award amounts of the slot machine paytable to achieve approximately the same payout rate for the interim pattern awards as for the slot machine. Where relatively few award amounts are offered in the paytable for the slot machine, a set of interim patterns may be mapped to the award amounts, with the interim patterns having approximately the same odds of being matched on a player's Bingo card as the odds of the slot machine paying out the corresponding award amount.

The alternate outcome display may be provided at the gaming units 20 in addition to the display of the Bingo game discussed above. For the above example, the outcome of the Bingo game may be displayed at the first display device 68 of the gaming unit 20, and the alternate outcome display may be provided at the second display device 70 as an electromechanical set of slot reels. While the controller 100 may be utilized, the gaming unit 20 may be provided with multiple controllers 120, 140, as discussed above. The first controller 120 may execute the multi-player Bingo game routine 700 of FIGS. 7A and 7B. The first controller 120 may display the outcome determined at block 732 and provide the outcome to the second controller 140. The second controller 140 may determine a corresponding alternate outcome display and cause the display unit 70 to display the alternate outcome display. In addition, the second controller 140 may execute the alternate display routines 400, 420 of FIGS. 6A and 6B, respectively to cause the alternate outcome display to be visibly observed or visibly obscured, depending on a corresponding request from the player. The first controller 120 may further provide the second controller 140 with data relating to a daub prompt, in response to which the second controller 140 may cause a corresponding daub prompt to be displayed on the display unit 70, as discussed further below.

Figure 11A:
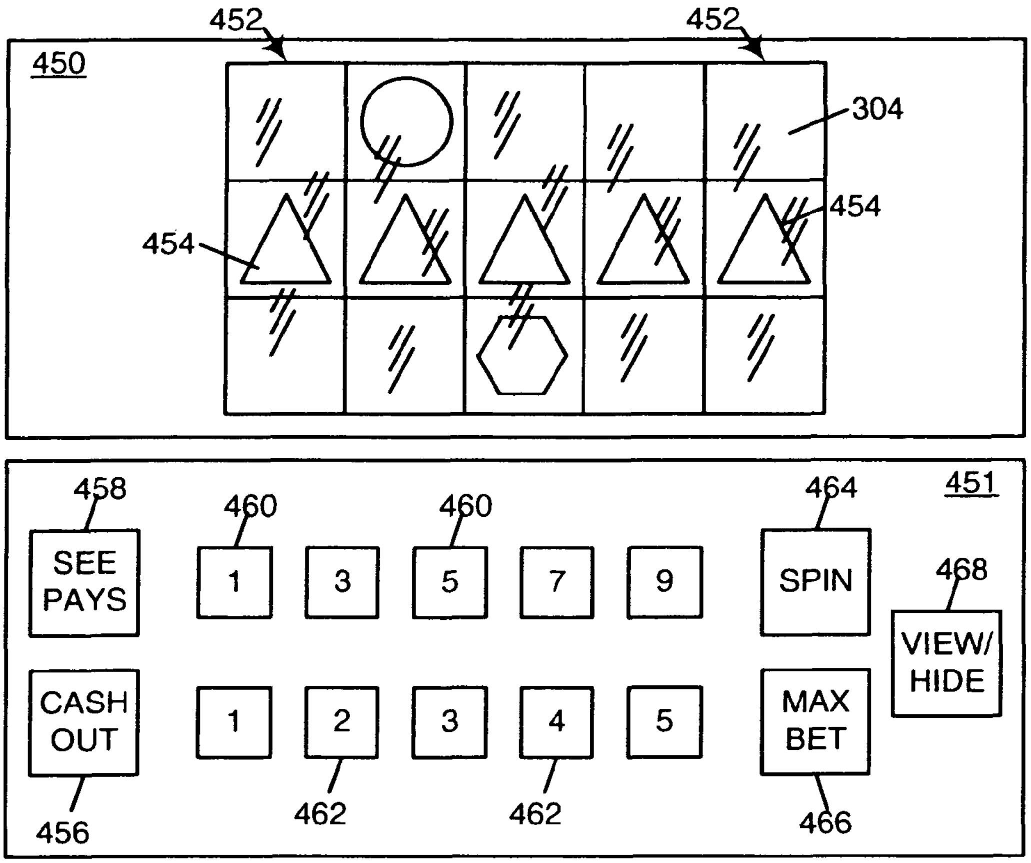
FIGS. 11A-11C are illustrations of an embodiment of a slots display that may be displayed as an alternate outcome display.
Figure 11B:
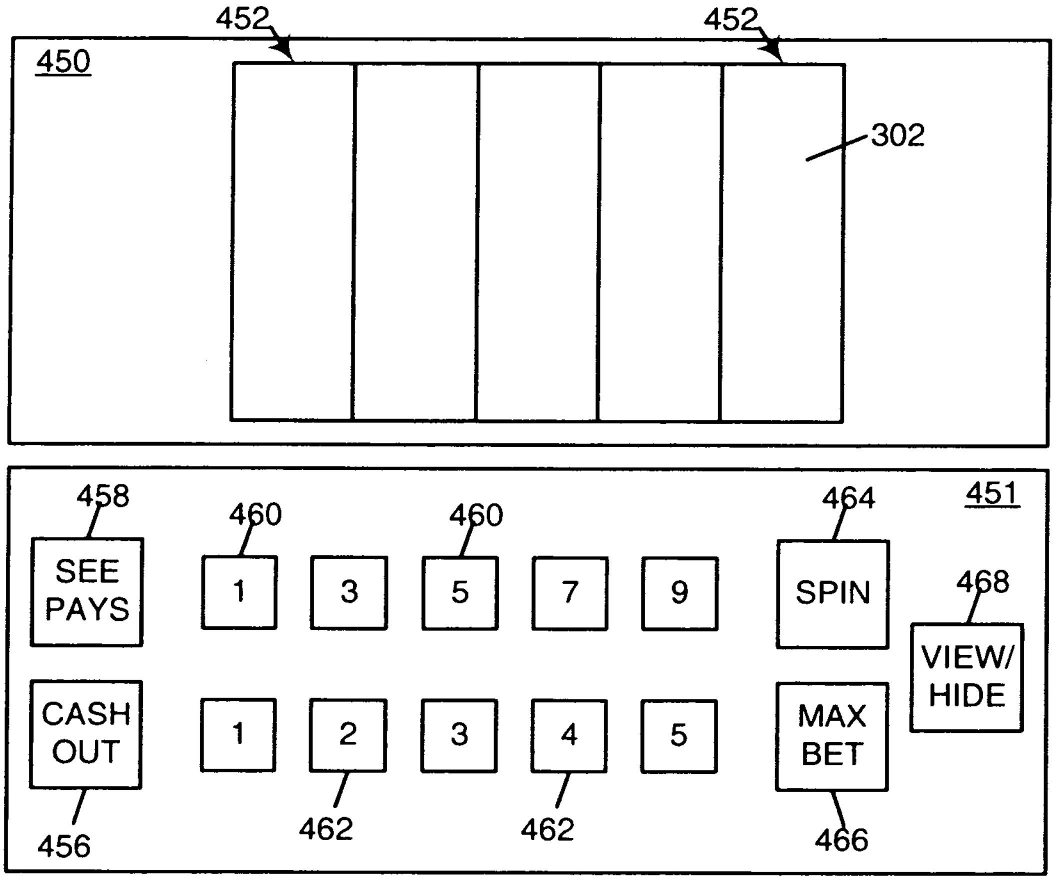
Figure 11C:
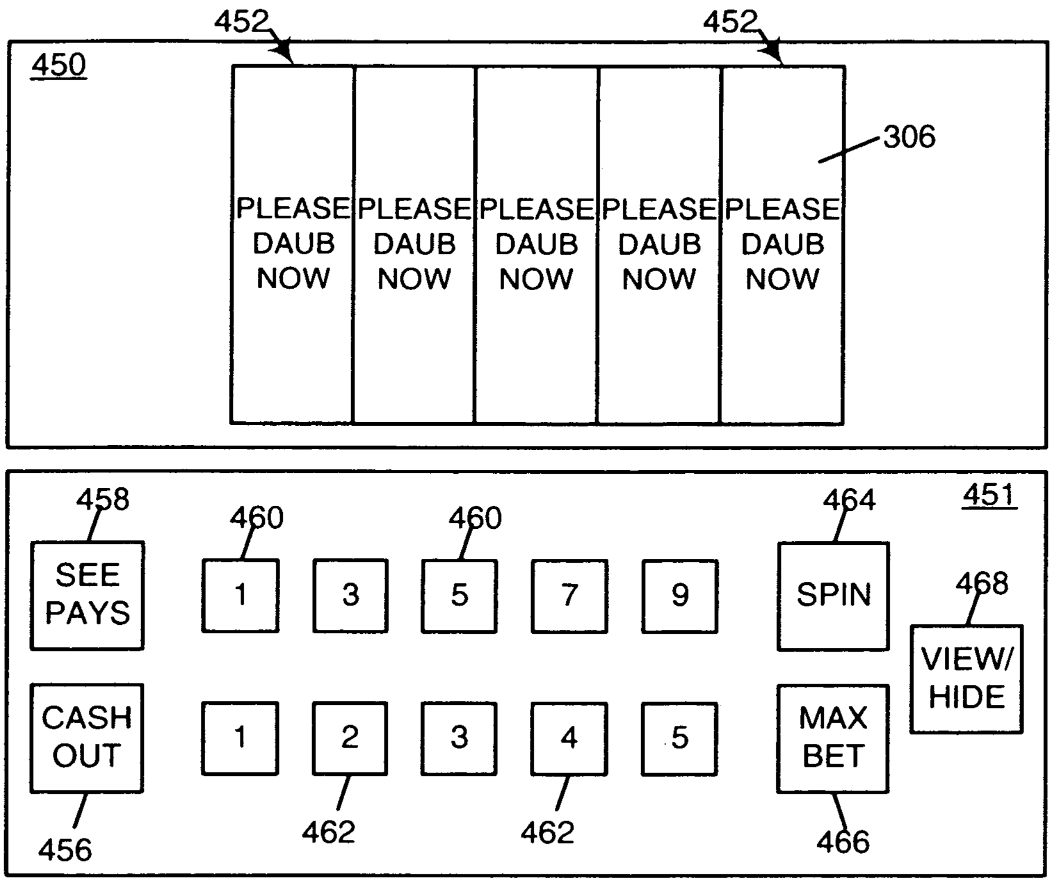

FIGS. 11A-11C are exemplary displays 450 that may be shown on the display unit 70 as an alternate outcome display and corresponding control panels 451, which may be provided as the control panel 66, as a separate control panel or as a display shown on the display unit 70 if provided with a touch-screen video display. Referring to FIG. 11A, the display 450 may include a plurality of slot machine reels 452, each of the reels having a plurality of reel symbols 454 associated therewith. Although the display 450 shows five reel images 452, each of which may have three reel symbols 454 that are visible at a time, other reel configurations could be utilized.

To allow the player to control the play of the Bingo game, the control panel 451 may include a plurality of player-selectable buttons that may map wagering selections for a slot machine to wagers by the players on the Bingo game. The buttons may include a "Cash Out" button 456, a "See Pays"

button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, a "Max Bet" button 466 to allow a player to make the maximum wager allowable, and a "View/Hide" button 468 to allow the player to visibly display or visibly obscure the alternate outcome display.

If the player requests that the alternate outcome display be visibly displayed or visibly obscured, such as by activating the "View/Hide" button 468, the gaming unit 20 may cause the alternate outcome display to be displayed or obscured on the display unit 70. For example, the gaming unit 20 may execute the alternate display routine 400 or the alternate display routine 420. During execution of the alternate display routines 400, 420 of FIGS. 6A and 6B, the gaming unit 20 may cause the outer rotatable reel 202 to rotate to a position to dispose a cover portion in front of the inner rotatable reel corresponding to the display request. At blocks 412 and 428, the player has requested that the alternate outcome display be visibly displayed, and the gaming unit 20 may cause the outer rotatable reel 202 to rotate until the transparent cover portion 304 is disposed in front of the inner rotatable reel 204 resulting in the display 450 shown in FIG. 11A. On the other hand, at blocks 410 and 426, the player has requested that the alternate outcome display be visibly obscured. The gaming unit 20 may thereby cause the outer rotatable reel 202 to rotate until the opaque cover portion 302 is disposed in front of the inner rotatable reel 204 resulting in the display 450 shown in FIG. 11B. The gaming unit 20 may further cause the inner rotatable reel 204 to not spin.

If the player requests payout information, such as by activating the "See Pays" button 458, the gaming unit 20 may cause one or more paytables to be displayed on the display unit 68 or the display unit 70. The paytable may correspond to a five reel slot machine having three stop positions per reel such that 15 symbols are displayed as shown in FIG. 11A. When the reels are spun and stop, each of the paylines on which the player wagers is evaluated to determine whether the symbols on the reels match any of the predefined combination of reel symbols for which a prize is awarded. More than one payline may include a winning combination of reel symbols, and the award amounts for multiple paylines may be added to determine a total award amount for the reel spin.

Each award amount in the slot machine paytable may correspond to one or more combinations of reel stop positions that when hit by the slot machine result in the payout of the associated award amount. The mapping of the interim patterns to the slot machine paytable may further include mapping the interim patterns to the combination or combinations of reel stop positions corresponding to the award amount. For each interim pattern and corresponding award amount, the gaming unit 20 may store the available combination or combinations of reel stop positions to be displayed at the alternate outcome display to represent the outcome of the Bingo game. When a given interim pattern is matched on the Bingo card, the gaming unit 20 may randomly or sequentially select one of the available combinations of reel stop positions corresponding to the award amount, and cause the alternate outcome display to display the slot reels in the appropriate positions to display a slot machine outcome that if determined by a slot machine engine would result in the payout of the award amount.

During the execution of the multi-player Bingo game routine 700 of FIGS. 7A and 7B, or other routines for conducting the Bingo game, the gaming unit 20 may control the alternate outcome display to achieve a realistic simulation of the casino game used to display the outcome of the Bingo game. At blocks 704 and 706, once two or more players enroll in the occurrence of the Bingo game, thereby ensuring that the Bingo game may be played, the gaming unit 20 may cause the display device 70 to display an animated graphic or other display simulating the initiation of the casino game. For example, if a slot machine is being simulated, the gaming unit 20 may cause the display device 70 to start the electromechanical spinning as if a player had hit a "Spin" button or pulled the arm of a slot machine. For video card games, the display device 70 may display a graphic of a deck of cards being shuffled or of hands being dealt face down by a dealer. Still further, for video Keno games, the display device 70 may display a graphic of a blower-type ball draw mechanism tumbling the Keno balls.

The animated display may continue until the outcome of the ball draw is displayed to the player, and the player is prompted to daub in order to complete the Bingo game. At block 722, if the gaming unit 20 is configured to display prompts to the player instructing the player to daub in order to complete the Bingo game, the gaming unit 20 may cause the outer rotatable reel 202 to rotate to a position to dispose a cover portion in front of the inner rotatable reel corresponding to the prompt. For example, the gaming unit 20 may cause the outer rotatable reel 202 to rotate until the instructional cover portion 304 is disposed in front of the inner rotatable reel 204 resulting in the display 450 shown in FIG. 11C. As should be understood, although FIG. 11C depicts a daub prompt, additional instructions (e.g., enroll, deposit currency, win/lose, etc.) may be displayed by the display unit 70 and utilized throughout the course of the multi-player Bingo game routine 700.

The daub prompt may continue until the player marks the numbers on the Bingo card after the ball draw. The animated display may resume until the Bingo game winner or winners are determined and the Bingo cards are evaluated for interim patterns and corresponding award amounts. After the awards are determined at block 730, in addition to displaying the Bingo game outcome and award graphics at the display device 68 at block 732, the gaming device 20 may also determine and display at the display device 70 an alternate outcome display corresponding to the Bingo game outcome. Using the outcome of the Bingo game and corresponding award amount, the gaming unit 20 may select one of the available alternate outcome displays for the outcome and award amount, and cause the display device 70 to display the selected outcome display. For a slot machine, the gaming unit 20 may cause the display device 70 to stop the reels at the corresponding combination of reel stop positions. Similarly, for video card games, the display device 70 may display player and/or dealer hands that would result in the payout of the award amount by the corresponding video card game.

While a single level of Bingo patterns may be appropriate to map a paytable for a casino game having a relative small number of award amounts, the multi-level pattern mapping strategy discussed above may be necessary to configure the Bingo game dynamics to correspond to a casino game desired to be used as an alternate outcome display having a large number of available award amounts. In one example of a slot machine having five reels with three symbols per reel being displayed, and players being able to wager on up to nine paylines, the paytable may contain hundreds of available award amounts. A further explanation of mapping for an alternate outcome display is disclosed in U.S. application Ser. No. 10/887,111, referred to above and expressly incorporated by reference herein.

While the embodiment of an alternate outcome display illustrated and discussed herein may simulate the appearance of a slot machine, those skilled in the art will understand that other casino games may be simulated in an alternate outcome display, with the award amounts for the casino game's pay-table being mapped to single or multiple levels of Bingo patterns. For example, the alternate outcome display may simulate the appearance of a video poker machine. The award amounts for the video poker machines may correspond to one or more poker hands. When particular Bingo patterns are matched by a player in an occurrence of the Bingo game resulting in the payout of an award amount, the gaming unit 20 may select an available poker hand corresponding to the award amount for display at the display device 70. Other casino games may be similarly mapped and simulated by the alternate outcome display in a similar manner. Moreover, the gaming units 20 may be programmed with a plurality of alternate outcome displays corresponding to a plurality of casino games, with the player being provided with the opportunity to select a desired one of the available alternate outcome displays.

What is claimed is:

1. A gaming apparatus comprising:

an input device;

a first display unit;

a second display unit including an outer rotatable reel and an inner rotatable reel independently rotatable inside the outer rotatable reel, the outer rotatable reel including a transparent cover portion and an opaque cover portion;

a controller configured to operate with the input device, the first display unit and the second display unit to:

receive data relating to a first multi-player wagering game outcome for a play of a multi-player wagering game, cause the first display unit to display the first multi-player wagering game outcome, independent of the first multi-player wagering game outcome, enable a player to input one of:

(i) a display request to obscure the second display unit, and (ii) a display request to observe the second display unit, if the player inputted the display request to obscure the second display unit, cause the second display unit to rotate the outer rotatable reel to dispose the opaque cover portion in front of the inner rotatable reel, and if the player inputted the display request to observe the second display unit:

(i) cause the second display unit to rotate the outer rotatable reel to dispose the transparent cover portion in front of the inner rotatable reel, (ii) determine a second outcome display corresponding to the first multi-player wagering game outcome, and (iii) cause the second display unit to display to the player the determined second outcome display.

2. The gaming apparatus in accordance with claim 1, wherein the first display unit includes a video display unit, and if the multi-player wagering game includes a video bingo game, the controller causes the first display unit to display at least one video image including an image of a bingo grid.

3. The gaming apparatus in accordance with claim 1, wherein the second outcome display includes a display of a second wagering game outcome of a second wagering game.

4. The gaming apparatus in accordance with claim 3, wherein the second wagering game includes a slots game.

5. The gaming apparatus in accordance with claim 1, wherein the inner rotatable reel includes one or more game indicia disposed on a peripheral surface of the rotatable reel.

6. The gaming apparatus in accordance with claim 1, wherein the controller is configured to:

cause the first display unit to display a game array having a combination of indicia from a range of game indicia for the play of the multi-player wagering game, receive data relating to a plurality of randomly selected individual game indicia from the range of game indicia during the play of the multi-player wagering game, compare a pattern of game indicia on the game array with the randomly selected game indicia, and determine the first multi-player wagering game outcome based on the pattern of indicia on the game array.

7. The gaming apparatus in accordance with claim 6, wherein the outer rotatable reel includes a peripheral surface having instruction indicia disposed on a portion of the peripheral surface, and the controller is configured to cause the second display unit to dispose the peripheral surface portion in front of the inner rotatable reel to display the instruction indicia to the player.

8. The gaming apparatus in accordance with claim 7, wherein the instruction indicia includes instructions to mark the pattern of indicia.

9. The gaming apparatus in accordance with claim 1, wherein the second outcome display further includes:

one or more outer rotatable reels, a plurality of the inner rotatable reels rotatably disposed inside the one or more outer rotatable reels, each inner rotatable reel having indicia for a second wagering game disposed on a peripheral surface of the rotatable reel, and the controller is configured to cause the inner rotatable reels to rotate and stop at a position with indicia corresponding to the outcome of the second outcome display.

10. The gaming apparatus in accordance with claim 1, further including a memory configured to operate with the controller to store a plurality of second outcome displays corresponding to first multi-player wagering game outcomes, wherein the controller is configured to select from the memory one of the plurality of second outcome displays corresponding to the first multi-player wagering game outcome.

11. A method of operating a gaming system, said method comprising:

causing at least one processor to execute a plurality of instructions to determine a first wagering game outcome of a first wagering game;

causing the at least one processor to execute the plurality of instructions to determine a second wagering game outcome of a second wagering game corresponding to the first wagering game outcome;

causing a first display device to display the first wagering game outcome;

causing a second display device to display the second wagering game outcome, wherein the second display device includes an outer rotatable reel and an inner rotatable reel inside the outer rotatable reel; and independent of the first wagering game outcome and in response to receiving an input from a player to not display the second wagering game outcome, preventing the display of the second wagering game outcome by disposing a cover to visibly obscure the second wagering game outcome by rotating the outer rotatable reel to dispose an opaque cover portion in front of the second display device.

12. The method in accordance with claim 11, wherein causing the second display device to display the second wagering game outcome includes disposing the cover to visibly observe the second wagering game outcome in response to receiving an input from the player to display the second wagering game outcome.

13. The method in accordance with claim 12, wherein disposing the cover includes disposing a transparent cover portion of the cover in front of the second display device.

14. The method in accordance with claim 11, wherein the second display device includes the cover having instruction indicia disposed on a portion of a peripheral surface of the cover, and which includes displaying instruction indicia for the player.

15. The method in accordance with claim 11, wherein the second display device includes a plurality of the rotatable reels, each rotatable reel having indicia for the second wagering game disposed on a peripheral surface of the rotatable reel, and which includes: rotating the rotatable reels and stopping the rotatable reels at a position with indicia corresponding to the second wagering game outcome.

16. A method of operating a gaming system including a plurality of gaming apparatuses which each enable a player to participate in a play of a multi-player wagering game, said method comprising:

for each of the gaming apparatuses:

causing at least one processor to execute a plurality of instructions to determine an outcome for the play of the multi-player wagering game;

displaying the outcome for the play of the multi-player wagering game;

independent of the outcome for the play of the multi-player wagering game, enabling the player to input a display request;

if the display request relates to a request to obscure an alternate outcome display, disposing a cover to visibly obscure the alternate outcome display from the player, wherein disposing the cover to visibly obscure the alternate outcome display includes rotating an outer rotatable reel of an alternate outcome display device to dispose an opaque cover portion of the cover in front of the alternate outcome display, said alternate outcome display device including said outer rotatable reel and an inner rotatable reel inside the outer rotatable reel; and if the display request relates to a request to observe the alternative outcome display:

(i) disposing the cover to visibly display the alternate outcome display to the player, wherein disposing the cover to visibly display the alternate outcome display includes rotating the outer rotatable reel to dispose a transparent cover portion in front of the alternate outcome display, (ii) causing the at least one processor to execute the plurality of instructions to determine an alternate outcome display corresponding to the outcome for the play of the multi-player wagering game; and (iii) causing the alternate outcome display device to display the alternate outcome display.

17. The method in accordance with claim 16, wherein the alternate outcome display is a display of an outcome of a second wagering game.

18. The method in accordance with claim 16, further including:

displaying a game array having a combination of indicia from a range of game indicia for of the play of the multi-player wagering game;

receiving data relating to a plurality of randomly selected individual game indicia from the range of game indicia during the play of the multi-player wagering game;

comparing a pattern of game indicia on the game array with the randomly selected game indicia; and determining the outcome for the player for the play of the multi-player wagering game based on the pattern of indicia on the game array.

19. The method in accordance with claim 18, wherein the cover includes a peripheral surface having instruction indicia disposed on a portion of the peripheral surface, and which includes disposing the peripheral surface portion in front of the rotatable reel to display the instructions indicia to the player.

20. The method in accordance with claim 19, wherein the instruction indicia includes instructions to mark the pattern of indicia.

21. The method in accordance with claim 16, wherein the alternate outcome display includes a plurality of the rotatable reels, each rotatable reel having indicia for a second wagering game disposed on a peripheral surface of the rotatable reel, and one or more of the covers variably disposed in front of the rotatable reels, and which includes: rotating the rotatable reels and stopping the rotatable reels at a position with indicia corresponding to the outcome of the alternate outcome display.

22. The method in accordance with claim 16, further including:

storing a plurality of alternate outcome displays corresponding to outcomes of the multi-player wagering game at the gaming apparatus; and selecting the alternate outcome displays corresponding to the outcome for the player for the play of the multi-player wagering game from the plurality of stored alternate outcome displays.

23. A method of operating a gaming system including a plurality of gaming apparatuses, the method comprising:

for each of the gaming apparatuses:

receiving a deposit of an amount of a medium of currency by a player;

receiving input for a wager on a play of a multi-player wagering game;

displaying a game array of game indicia for the play of the multi-player wagering game;

receiving a plurality of randomly selected game indicia;

causing at least one processor to execute a plurality of instructions to compare the randomly selected game indicia to the game indicia of the game array in the order that the game indicia are selected;

causing the at least one processor to execute the plurality of instructions to determine a multi-player wagering game outcome for the play of the multi-player wagering game based on the comparison of the randomly selected game indicia to the game indicia of the game array, wherein the multi-player wagering game outcome is a winning multi-player wagering game outcome if a pattern formed by game indicia on the game array matching the randomly selected game indicia matches at least one predetermined game award-winning pattern;

displaying the multi-player wagering game outcome;

independent of the multi-player wagering game outcome, enabling the player to input one of:

(i) a display request to obscure any alternate outcome display, and (ii) a display request to observe at least one alternate outcome display;

if the player inputted the display request to obscure any alternate outcome display, disposing a cover to visibly obscure an alternate outcome display from the player, wherein disposing the cover to visibly obscure the alternate outcome display includes rotating an outer rotatable reel of an alternate outcome display device to dispose an opaque cover portion of the cover in front of the alternate outcome display, said alternate outcome display device including the outer rotatable reel and an inner rotatable reel inside the outer rotatable reel; and if the player inputted the display request to observe at least one alternate outcome display:

(i) disposing the cover to visibly display the alternate outcome display to the player, wherein disposing the cover to visibly display the alternate outcome display includes rotating the outer rotatable reel to dispose a transparent cover portion in front of the alternate outcome display;

(ii) causing the at least one processor to execute the plurality of instructions to determine an alternate outcome display corresponding to the multi-player wagering game outcome; and (iii) causing the alternate outcome display device to display the determined alternate outcome display.

24. The method in accordance with claim 23, wherein the alternate outcome display is a display of a second wagering game outcome of a second wagering game.

25. The method in accordance with claim 23, further includes:

displaying a game array having a combination of indicia from a range of game indicia for the play of the multi-player wagering game;

receiving data relating to a plurality of randomly selected individual game indicia from the range of game indicia for the play of the multi-player wagering game;

comparing a pattern of game indicia on the game array with the randomly selected game indicia; and causing the at least one processor to execute the plurality of instructions to determine the multi-player wagering game outcome based on the pattern of indicia on the game array.

26. The method in accordance with claim 25, wherein the cover includes a peripheral surface having instruction indicia disposed on a portion of the peripheral surface, and which includes disposing the peripheral surface portion in front of the rotatable reel to display the instructions indicia for the player.

27. The method in accordance with claim 26, wherein the instruction indicia includes instructions to mark the pattern of indicia.

28. The method in accordance with claim 23, wherein the alternate outcome display includes a plurality of the rotatable reels, each rotatable reel having indicia for a second wagering game disposed on a peripheral surface of the rotatable reel, and one or more of the covers variably disposed in front of the rotatable reels, and which includes: rotating the rotatable reels and stopping the rotatable reels at a position with indicia corresponding to the outcome of the alternate outcome display.

29. The method in accordance with claim 23, further includes selecting one of a plurality of alternate outcome displays corresponding to the multi-player wagering game outcome.

* * * * *